US011298867B2

(12) United States Patent
Baumgarte et al.

(10) Patent No.: US 11,298,867 B2
(45) Date of Patent: Apr. 12, 2022

(54) METHOD AND DEVICE FOR PRODUCING A CONTAINER FROM A THERMOPLASTIC PARISON

(71) Applicant: KHS GmbH, Dortmund (DE)

(72) Inventors: Rolf Baumgarte, Ahrensburg (DE); Michael Linke, Hamburg (DE); Michael Litzenberg, Börnsen (DE); Benjamin Jaiser, Hamburg (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 17/041,062

(22) PCT Filed: Mar. 28, 2019

(86) PCT No.: PCT/EP2019/057837
§ 371 (c)(1),
(2) Date: Sep. 24, 2020

(87) PCT Pub. No.: WO2019/185780
PCT Pub. Date: Oct. 3, 2019

(65) Prior Publication Data
US 2021/0094218 A1 Apr. 1, 2021

(30) Foreign Application Priority Data
Mar. 29, 2018 (DE) .................... 10 2018 107 676.2

(51) Int. Cl.
*B29C 49/36* (2006.01)
*B29C 49/46* (2006.01)
(Continued)

(52) U.S. Cl.
CPC .............. *B29C 49/36* (2013.01); *B29C 49/46* (2013.01); *B29C 49/48* (2013.01);
(Continued)

(58) Field of Classification Search
CPC .............. B29C 49/46; B29C 2049/465; B29C 2049/4655; B29C 2049/4664;
(Continued)

(56) References Cited

U.S. PATENT DOCUMENTS 5,026,267 A * 6/1991 Miyabe ................... B29C 49/56
425/451.9
5,346,386 A 9/1994 Albrecht et al.
(Continued)

FOREIGN PATENT DOCUMENTS

DE 4212583 A1 10/1993
DE 4340291 A1 6/1995
(Continued)

OTHER PUBLICATIONS

International Search Report dated Aug. 10, 2019 filed in PCT/EP2019/057837.

*Primary Examiner* — Robert B Davis
(74) *Attorney, Agent, or Firm* — Rankin, Hill & Clark LLP

(57) ABSTRACT

The invention relates to a method for producing a container from a thermoplastic parison, the container being produced from the parison with the aid of a fluid, either by blow molding and subsequent filling with a fluid that is in particular liquid, or being produced by hydroforming and subsequently containing the liquid fluid as contents, and, during the blow-molding process and/or when receiving the in particular liquid fluid, the container revolves about and is spaced apart from an axis of rotation extending, in particular, vertically, in a mold that can be opened. According to the invention, the closed mold adopts, at least temporarily, an inclined position, i.e. that deviates from a perpendicular position.

43 Claims, 13 Drawing Sheets

Figure 1:
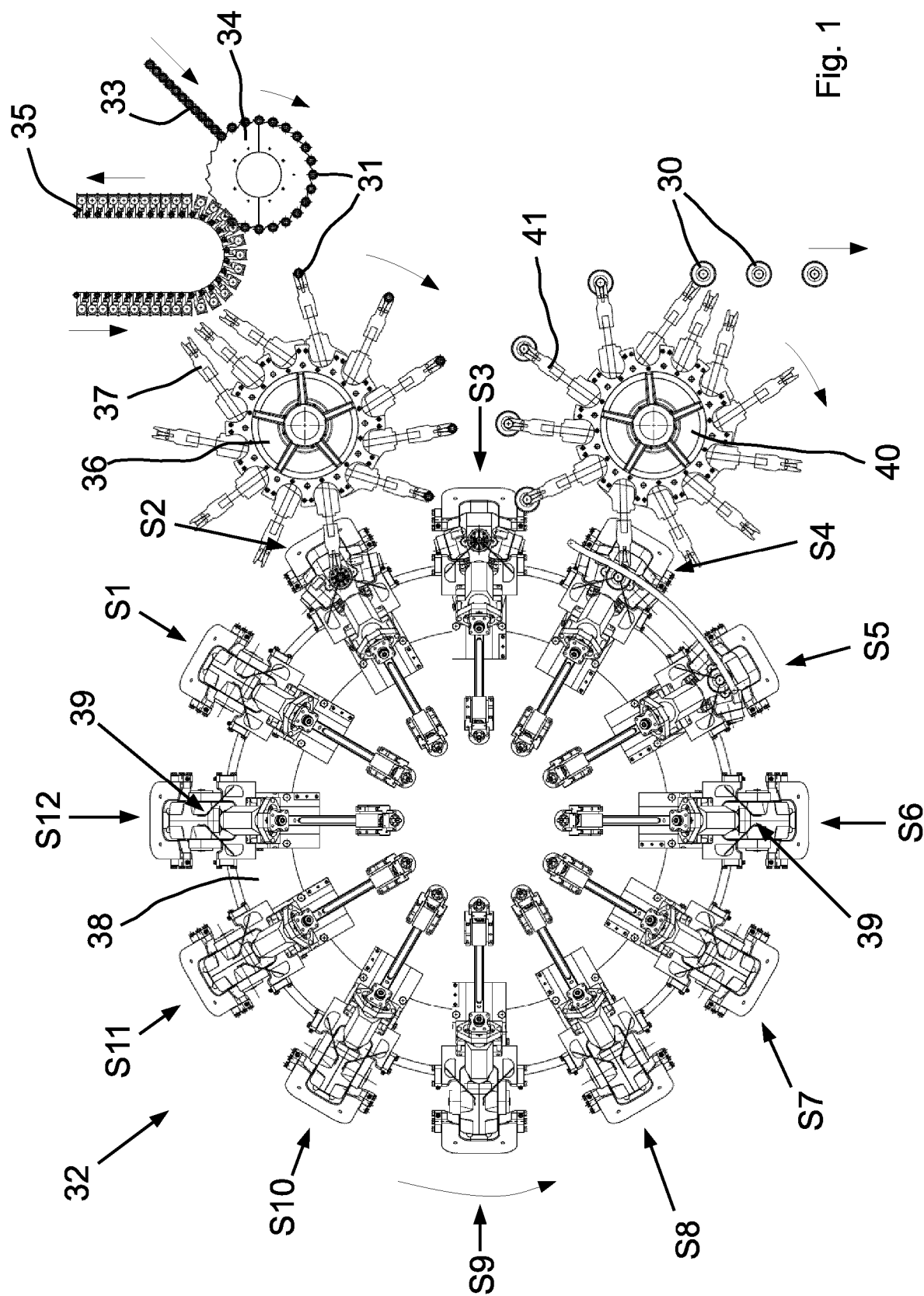

(51) Int. Cl.
  *B29C 49/48* (2006.01)
  *B29K 67/00* (2006.01)
  *B29L 31/00* (2006.01)

(52) U.S. Cl.
  CPC .............. *B29C 2049/4664* (2013.01); *B29C 2049/4879* (2013.01); *B29K 2067/003* (2013.01); *B29L 2031/7158* (2013.01)

(58) Field of Classification Search
  CPC ... B29C 49/36; B29C 2049/566; B29C 49/56; B29C 2049/4815; B29C 49/48
  See application file for complete search history.

(56) References Cited

U.S. PATENT DOCUMENTS

| | | | |
|---|---|---|---|
| 5,648,026 A | 7/1997 | Weiss | |
| 6,824,731 B1* | 11/2004 | Zoppas | B29C 49/4205 264/523 |
| 7,914,726 B2 | 3/2011 | Andison et al. | |
| 8,714,957 B2* | 5/2014 | Blochmann | B29C 49/56 425/182 |
| 2004/0104517 A1 | 6/2004 | Kronseder | |
| 2012/0091631 A1 | 4/2012 | Blochmann et al. | |
| 2012/0266567 A1 | 10/2012 | Haesendonckx et al. | |
| 2014/0157726 A1 | 6/2014 | Clüsserath et al. | |
| 2014/0157734 A1 | 6/2014 | Chauvin et al. | |
| 2014/0161920 A1 | 6/2014 | Winzinger | |
| 2015/0343696 A1* | 12/2015 | Geltinger | B29C 49/30 264/523 |
| 2016/0250797 A1 | 9/2016 | Michel et al. | |
| 2017/0028611 A1 | 2/2017 | Diesnis et al. | |
| 2017/0072618 A1 | 3/2017 | Desoutter et al. | |

FOREIGN PATENT DOCUMENTS

| | | |
|---|---|---|
| DE | 102010007541 A1 | 6/2011 |
| DE | 102010048720 A1 | 4/2012 |
| DE | 102011079077 A1 | 1/2013 |
| DE | 102010064585 A1 | 4/2015 |
| DE | 102014019722 A1 | 12/2015 |
| DE | 102015208956 A1 | 11/2016 |
| EP | 2930005 A1 | 10/2015 |
| EP | 2944450 A1 | 11/2015 |
| FR | 3011763 A1 | 4/2015 |
| WO | 2012104019 A1 | 8/2012 |
| WO | 2013020885 A1 | 2/2013 |

* cited by examiner

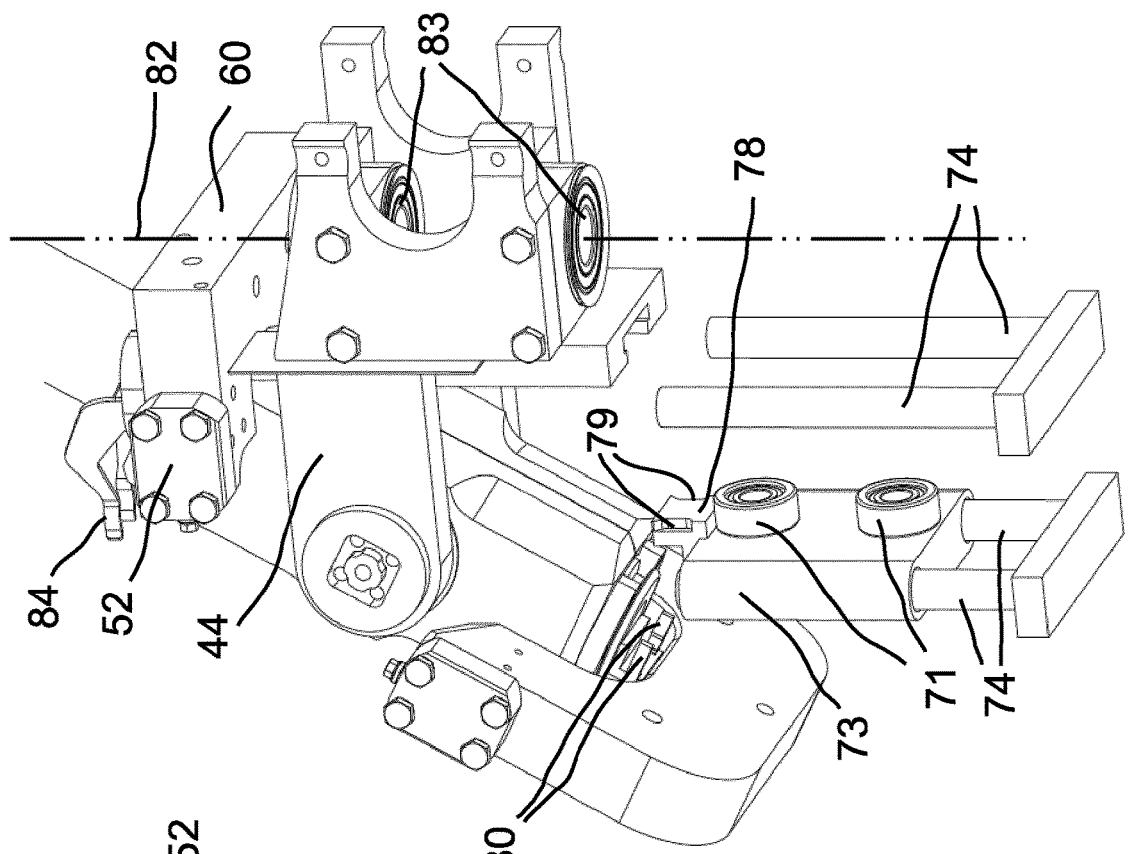
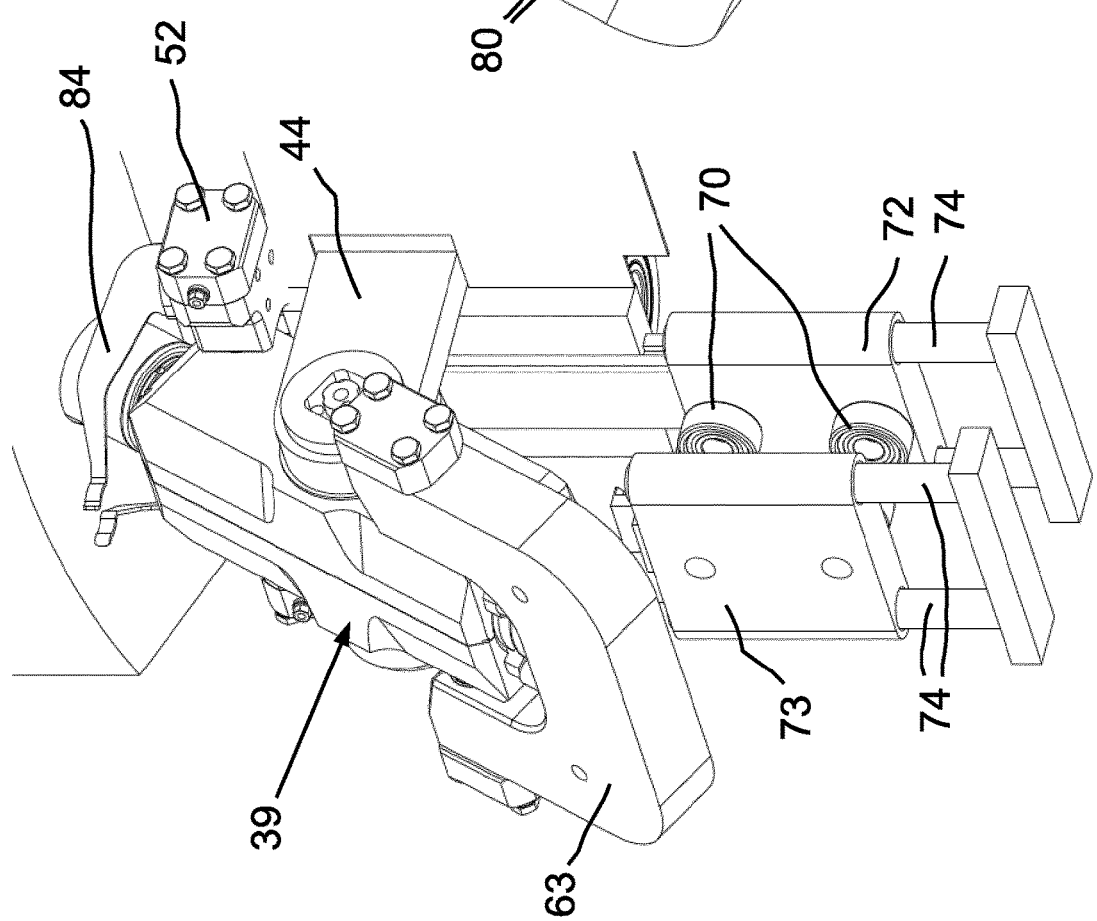

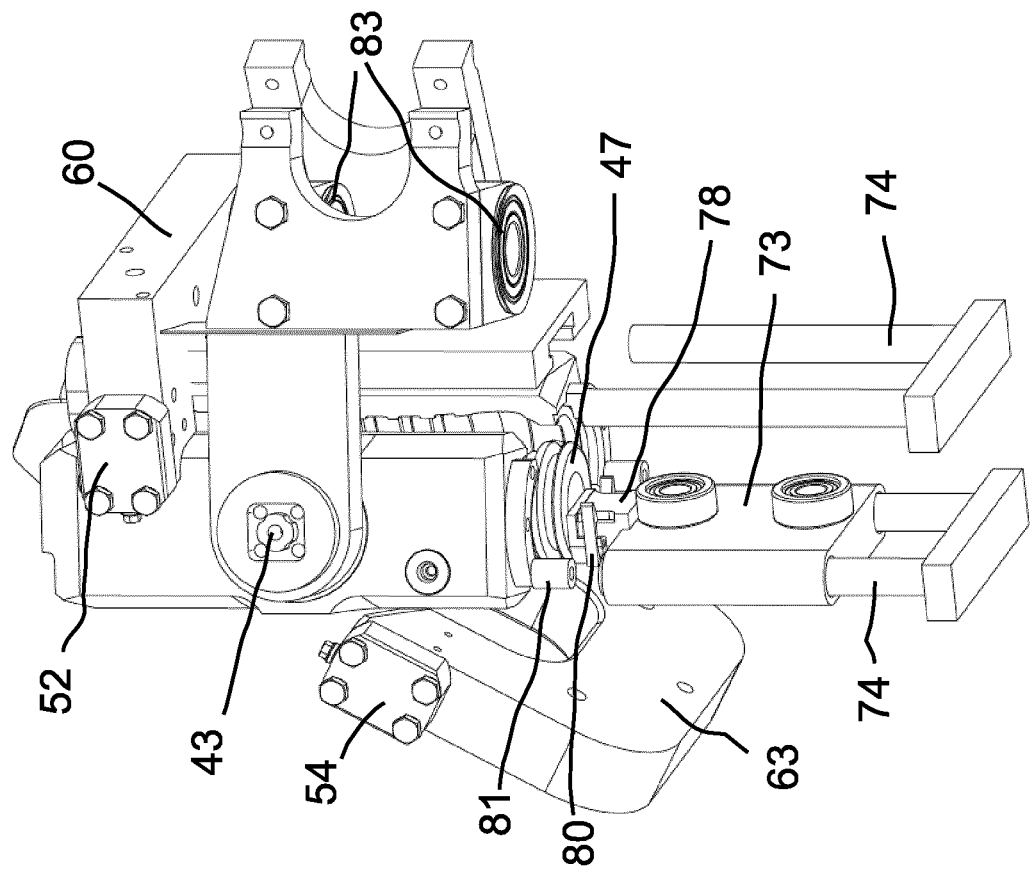
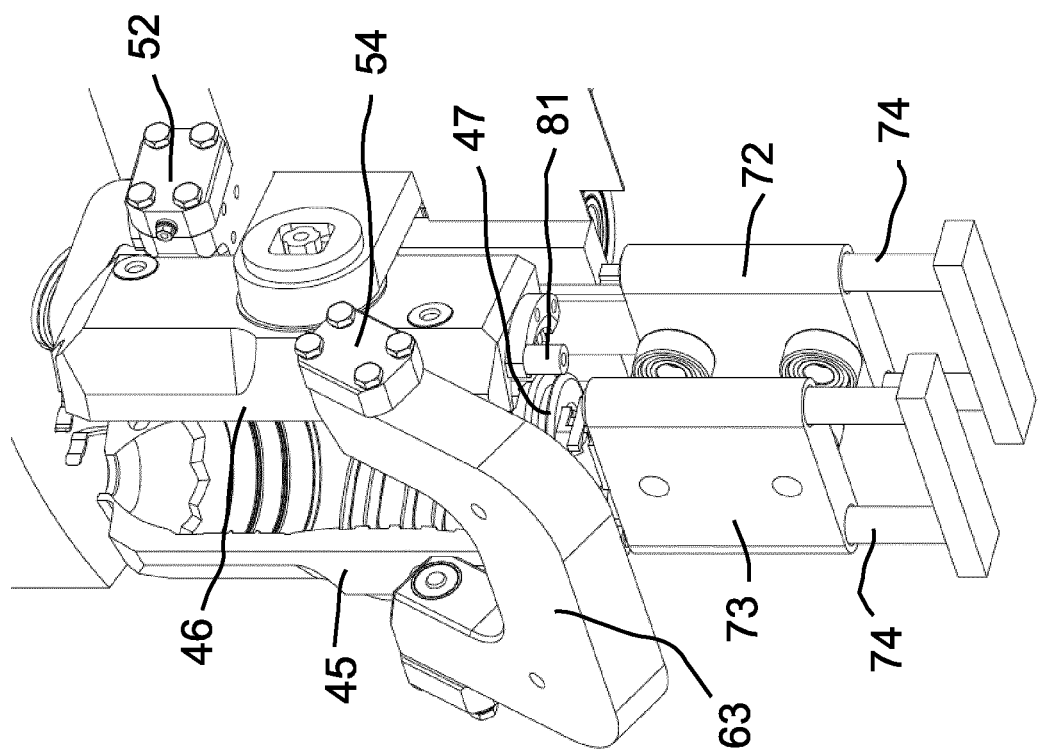
Fig. 15
Fig. 14

METHOD AND DEVICE FOR PRODUCING A CONTAINER FROM A THERMOPLASTIC PARISON

The invention relates to a method for producing a container from a thermoplastic parison, wherein the container is produced from the parison with the aid of a fluid either by blow molding and subsequent filling with a fluid that is in particular liquid, or is produced by hydroforming and thereby subsequently contains the liquid fluid as contents, and wherein the container revolves about and is spaced apart from a particularly vertical axis of rotation in a mold, which can be opened, during the blow-molding process and/or when receiving the in particular liquid fluid as well as a device for producing containers from thermoplastic parisons, having a working wheel rotating about a particularly vertical axis of rotation on said working wheel stations, which are sequential in the circumferential direction, are provided with molds for receiving and particularly for forming the containers and circulate with the working wheel, wherein a valve assembly is assigned preferably to each station for supplying a fluid, which is particularly under pressure, and the molds can be opened for removal of the containers. This preferably is a method and a device for producing bottles by means of blow molding, i.e. with the aid of a gaseous fluid, or by means of a liquid filling material.

The production of containers by means of blow molding from parisons made of a thermoplastic material, for example from parisons made of PET (polyethylene terephthalate), is known from DE 43 40 291 A1. The thermally conditioned parisons are routed, within a blow molding machine, to different processing stations. Typically, a blow molding machine has a heating device for temperature control and/or thermal conditioning of the parisons as well as a blowing device with at least one blowing station, in the region of which the previously temperature-conditioned parison is expanded into a container. The expansion takes place with the aid of a compressed gas, which is introduced into the parison to be expanded with a forming pressure. The process-engineering sequence is explained in the aforementioned DE 43 40 291 A1. The basic structure of a blowing station is described in DE 42 12 583 A1. Temperature control or thermal conditioning is understood to mean that the parison is heated to a temperature suitable for the blow molding, and a temperature profile is optionally applied to the parison. The blow molding of containers made from parisons with the additional use of a stretching rod for stretching the parisons is likewise known.

The containers produced by means of blow molding are typically fed to a downstream filling device and filled with the intended product or filling material. Thus, a separate blow molding machine and a separate filling machine are used. These machines can also be combined into a machine module, wherein, furthermore, the blow molding and the filling take place on separate machine components and one after the other.

It is likewise known to form the containers from the parisons by means of the filling material itself, i.e. with the use of the filling material as a hydraulic pressure medium; see DE 10 2010 007 541 A1 and U.S. Pat. No. 7,914,726 B2. Thus, the respective parison is formed into the container at the same time as the filling, i.e. by means of a hydraulic reforming process. This reforming can also be supported through the use of a stretching rod.

It is furthermore known to seal filled containers in a subsequent work step. To that end, the containers, for example, are transferred to a transport device by the filling device, after filling is complete, and routed to a sealing device. It is possible to block the sealing device with upstream machines. However, the containers can also be sealed while still on a working wheel for the filling; see DE 10 2010 007 541 A1 and WO 2012/104019 A1. Both documents disclose that the filled containers are provided with a seal while still within the forming and filling station, in which a parison is reformed into a container due to the introduction of the filling material under pressure.

The working wheel with the containers rotates about a particularly perpendicular axis. In this case, the containers are aligned axially parallel to this, i.e. with the opening pointing upward. A valve assembly is provided for the filling, which is placed on the opening with an attachment and seals it during filling to the extent that no liquid can escape, and the required pressure is established. After filling, the containers are transferred to an extraction conveyor. The valve assembly attachment must be detached from the container beforehand.

The orientation of the liquid level in the filled, upright containers, which simultaneously circulate with the working wheel, depends on the degree of filling and on the centrifugal force which occurs. In practice, the rotational speed of the working wheel is thereby limited. Upon the complete filling of the containers, a higher rotational speed would cause a greatly inclined liquid level, which would cause the liquid to escape after removal of the valve assembly from the container opening.

Another problem during forming of the containers by means of blow molding or by means of hydraulic reforming is the secure sealing of the molds. Typically, a mold consists of two mold shells, also characterized as mold halves, and one mold base. The mold shells are held together particularly along a perpendicular plane. In doing so, the mold base is inserted from below into an opening formed by the mold shells and retained with positive-locking. In the broadest sense, the mold shells are flexibly connected to one another and pivot apart for removal of the containers. The force for holding the mold shells is essentially applied via the joint provided for moving the mold shells. This joint must be dimensioned correspondingly; see, for example, DE 42 12 583 A1. The mold shells therein are mold carriers, each of which accommodates partial molds characterized as blow-molding elements.

The object of the present invention is to obtain a method and a device, with which liquid losses of the filled container on the working wheel can be prevented. A further object of the invention is to indicate a method and a device, with which improved retention of the molds is possible, i.e. during blow molding or during filling with the liquid.

Provided is a method for producing a container from a thermoplastic parison, the container being produced from the parison with the aid of a fluid, either by blow molding and subsequent filling with a fluid that is in particular liquid, or being produced by hydroforming and thereby subsequently containing the liquid fluid as contents, and, during the blow-molding process and/or when receiving the in particular liquid fluid, the container revolves about and is spaced apart from an axis of rotation extending, in particular, vertically, in a mold that can be opened. In order to achieve the object, in the method according to the invention the closed mold adopts, at least temporarily, an inclined position, i.e., that deviates from a perpendicular position.

According to the invention, the closed mold adopts, at least temporarily, an inclined position, i.e. that deviates from a perpendicular position, during the method. The tilt angle of the mold is defined in this case by the orientation of the container in space. In an upright position of the mold, the container is also aligned perpendicular, with the opening pointing upward. The closed mold may be in the inclined position exclusively or temporarily, preferably with an inclination in the direction of the axis of rotation. The adopting of an upright position is not absolutely necessary for the closed mold or for the open mold. If the mold is in an inclined position and is provided with a liquid, in the form of a fluid, the centrifugal forces which occur due to the circulation around the axis of rotation and act on the liquid are compensated for. A movement of the mold between an inclined position and a further, particularly perpendicular, position enables the targeted adopting of a position, in which the interior pressures occurring during forming or filling of the container can be accommodated and compensated for in the best-possible manner.

Preferably, the container is formed in the mold from the parison by means of the liquid provided as contents. Forming and filling of the container take place in one work step, namely by means of the liquid provided as the contents. Said liquid remains in the container after the final sealing of the container. Alternatively, the fluid for forming the container is a gas, preferably compressed air. Forming and filling of the container take place in sequential work steps. Initially, the design of the container is created in the mold by means of blow molding. Subsequently, the container is filled with a liquid.

It may additionally be provided that the parison is stretched by means of a stretching rod in a known manner.

According to a further concept of the invention, the mold adopts a perpendicular position at least for removal of the container. The removal of the container from the mold can then be implemented by means of a known transfer conveyor.

According to a further concept of the invention, it is provided that the mold is in a perpendicular position for insertion of the parison. Known transfer conveyors can then be used for inserting the parison.

According to a further concept of the invention, the closed mold is in the inclined position, at least at the end of the filling with the fluid, particularly during the entire filling process. This then results in a conformation of the position of the mold with the unit provided for filling the container. The mold is particularly in the perpendicular position for opening, particularly for removal of the respective container.

According to a further concept of the invention, the closed mold is situated in the inclined position with its upper side closer to the axis of rotation than its lower side. This enables the compensation of the centrifugal forces also acting on the fluid in the best-possible manner.

According to a further concept of the invention, the inclination of the closed mold, particularly in the direction of the axis of rotation, has one of the following conditions:
a) 15° to 45° deviation from the perpendicular position
b) 25° to 35° deviation from the perpendicular position
c) 30° deviation from the perpendicular position.

The inclinations indicated can apply to the closed mold always, predominantly, or sometimes and enable good compensation of the centrifugal forces acting on the liquid in modern filling devices with a corresponding alignment.

According to a further concept of the invention, the closed mold is moved into a position secured against opening caused by the internal pressure, before the adding of the fluid. After forming of the container, before the opening, the closed mold is moved from the position secured against opening caused by internal pressure into a position which is unsecured, in contrast, in which the mold is then opened.

According to a further concept of the invention, the closed mold is secured against opening caused by internal pressure in at least one of its positions, namely due to retention between at least two thrust bearings rigidly connected to each other. The thrust bearings retain the mold, namely by means of impact between the opposite sides of the mold, particularly of the mold shells or mold halves.

In a known manner, the mold may have a base part, which is particularly retained in a positive-locking manner by the mold shells when the mold is closed.

According to a further concept of the invention, it is provided that the closed mold is secured against opening caused by internal pressure by two thrust bearings, rigidly connected to one another, in an upper region and by two further thrust bearings, rigidly connected to one another, in a lower region. The forces occurring are thus accommodated and compensated for uniformly.

According to a further concept of the invention, the container is closed by means of a cover, particularly in an inclined position, before the opening of the mold. After placement of the cover, the container can then be manipulated as desired without the fluid being able to escape. A device in which the container is closed directly after filling is known, for example, from DE 10 2010 007 541 A1.

According to a further concept of the invention, a base part of mold is moved away from a retaining body and against the remaining part of the mold and then back again. In doing so, the base part is coupled to the retaining body. Before the tilting of the closed mold, the base part is decoupled from the retaining body. In the inclined position, the retaining body and the base part are decoupled; in the perpendicular position, the mold is sometimes or predominately coupled.

According to a further concept of the invention, the container in the open mold is secured, until removal, by means of securing elements adjacent a neck or a closure of the container, particularly in conjunction with a securing device by means of a mold base. The securing elements keep the container from being pressed out of the open mold due to the occurring centrifugal forces.

According to a further concept of the invention, the container in the open mold is secured, until removal, against a movement relative to the mold in the circumferential direction, against the circumferential direction, and/or outward radially.

According to a further concept of the invention, it is provided that the container has a neck at top with a support ring and that the container is removed from the open mold by means of grasping in a region between the support ring and a center of gravity of the container, particularly directly below the support ring. Due to the grasping under the support ring, the latter counteracts, in a positive-locking manner, the weight force of the container. A grasping of the container closer to the center of gravity reduces a tilting moment caused by the handling. Thus, heavier containers can also be securely grasped and conveyed.

The device for producing containers from thermoplastic parisons is provided with a working wheel rotating about a particularly vertical axis of rotation, on said working wheel stations, which are sequential in the circumferential direction, are provided with molds for holding and particularly for forming the container and circulate with the working wheel, wherein preferably a valve assembly is assigned to each station for supplying a fluid, which is particularly under pressure, and the molds can be opened for removal of the container. The closed molds are situated in an inclined position, namely that deviates from a perpendicular position, at least along a sub-section of the circulation about the axis of rotation. The closed molds can be tilted in their stations.

According to a further concept of the invention, the molds can each be mounted in the stations so as to tilt about an axis of inclination, wherein the axis of inclination extends close to a center of mass of the respective mold such that a distribution of mass of the mold is no more unequal than ⅓ to ⅔ on both sides of the axis of inclination. Preferably, the axis of inclination extends through the center of mass of the mold such that a torque due to the unequal distribution of mass is effective in no position of the mold. In particular, the empty mold is used for calculating the center of mass. The mold itself is relatively heavy. A container situated in the mold, with or without liquid, only slightly impacts the position of the center of mass.

According to a further concept of the invention, a drive may be provided for inclining the molds, particularly a cam controller or a motorized drive. The cam controller may contain a cam with mechanical transfer force, for example, via a sequence of cam roller, toothed rack, and gear wheel. Alternatively, a motorized drive may be provided, for example, electrically, pneumatically, or hydraulically, each also being coupled to a mechanical transfer of force.

According to a further concept of the invention, mold shells of the molds can be mounted on mold supports, wherein the mold supports or mold shells have tilt bearings with axes of inclination, and wherein the tilt bearings can be loosened in the axial direction. Due to the loosening of the tilt bearings, the mold shells can be detached from the mold supports and swapped out. To this end, suitable quick-release fasteners can be provided on the mold shell or on the mold support.

According to a further concept of the invention, the mold shells of the molds can be mounted on mold supports, wherein the mold supports or mold shells have tilt bearings with axes of inclination, and wherein the tilt bearings are sliding bearings, particularly plastic sliding bearings. Preferably, the sliding bearings are pre-tensioned to minimize play. The sliding bearings are also preferably resistant to water and cleaning agents.

According to a further concept of the invention, the molds are mounted in the stations so as to be tiltable, particularly with each having an axis of inclination extending tangentially as relates to the circumferential direction or preferably along a movement track, which defines a movement plane perpendicular to the tangents of the circumferential direction. In particular, only the closed molds are tiltable.

According to a further concept of the invention, mold shells of the molds are mounted on mold supports, wherein each mold support supports one mold shell, and wherein the mold supports, with the mold shells, assigned to a mold can be moved apart from one another for opening the mold and can be moved toward one another for closing the mold, particularly with a perpendicular parting line between the mold shells. Preferably, the parting line extends in the radial direction and along the axis of rotation as relates to the axis of rotation of the working wheel. In addition to the mold shells, a known mold base may be present.

According to a further concept of the invention, mold shells of the molds can be mounted directly on and proximate to mold supports, i.e. without mold mounts or mold retainers arranged in between. The arrangement of the mold shells between mold mounts is basically known but should be avoided preferably. Mold retainers for retaining the mold shells in the closed position are also known. If these are provided, they should not be provided between the mold shells and mold retainers in this case.

According to a further concept of the invention, the mold shells on the mold supports can be tilted particularly about an axis of inclination, wherein the mold supports or mold shells have tilt bearings for this. Thus, the two mold shells of a mold each have their own axis of inclination. When the mold is closed, the two axes of inclination extend advantageously coaxially as relates to one another.

The device for producing containers from thermoplastic parisons is provided with a working wheel rotating about a particularly vertical axis of rotation, on said working wheel stations, which are sequential in the circumferential direction, are provided with molds for receiving and particularly for forming the containers and circulate with the working wheel, wherein a valve assembly is assigned to preferably each station for supplying a fluid, which is particularly under pressure, and the molds can be opened for removal of the containers. According to the invention, thrust bearings are provided for securing the closed molds against opening caused by internal pressure, wherein the thrust bearings and molds can move relative to one another between one pressure-absorbing position, in which the thrust bearings impact the closed molds externally, particularly on the sides of the molds opposite one another, and another position, in which the thrust bearings do not impact the molds. In particular, the molds can be moved back and forth between the preferably stationary thrust bearings.

According to a further concept of the invention, the molds can each be mounted in the stations so as to tilt about an axis of inclination, wherein the axis of inclination extends close to a center of mass of the forces occurring due to the thrust bearings during the impacting of the respective closed mold such that the distribution of force is no more unequal than ⅓ to ⅔ on both sides of the axis of inclination. Preferably, the axis of inclination extends through the center of gravity of the force. If there are two thrust bearings for each mold shell and equal forces in each bearing, the center of gravity of the force is precisely in the middle between the two thrust bearings. If the axis of inclination extends outside of the center of gravity of the force, this will result in higher forces on one side of the axis of inclination than on the other side. This imbalance should particularly be no greater than ⅓ to ⅔.

According to a further concept of the invention, the molds can each be mounted in the stations so as to tilt about an axis of inclination, wherein the axis of inclination extends between the thrust bearings of each mold shell such that the distance between the axis of inclination and the next thrust bearing is no more than half as large as relates to the thrust bearing farthest away. Preferably, the axis of inclination extends through the middle between the thrust bearings.

According to a further concept of the invention, the thrust bearings may have a centering function such that the closed molds in the pressure-absorbing position are impacted by the thrust bearings in a centering manner. Due to the centering function, the mold shells or the molds are forced into defined positions, particularly relative to the valve assembly or to the working wheel.

According to a further concept of the invention, the thrust bearings contain driven movable plungers for establishing contact with the mold, particularly hydraulic plungers. A maximum pressure for retaining the mold shells can be applied using the plungers.

According to a further concept of the invention, thrust bearings of a station which are opposite one another are coupled together with force and positive locking, particularly mounted on a common bearing support, which forms a bearing gap for accommodating the respective mold. Advantageously, the bearing support is formed in a U shape with a bearing gap between support legs and with thrust bearings situated internally on the support legs. The pressure-absorbing position is in the bearing gap.

According to a further concept of the invention, thrust bearings opposite one another are provided for an upper region of the respective mold, particularly with a bearing support, which has a bearing gap which opens radially outward.

According to a further concept of the invention, thrust bearings opposite one another are provided for a lower region of the respective mold, particularly with a bearing support, which has a bearing gap which opens radially inward.

According to a further concept of the invention, support legs of the bearing support are aligned diagonally upward such that a support base connecting the support legs is positioned underneath a plane of a container base. With a stationary bearing support and an open perpendicular mold, the containers can be removed in the radial direction without the bearing support being in the way.

According to a further concept of the invention, each station has securing elements for securing the position of a container in the open mold.

According to a further concept of the invention, particularly stationary securing retainers are provided as the securing elements, and said securing retainers secure the containers against movements in the circumferential direction and are preferably effective in the region of a container head. The securing elements can be used on the neck, on the cover, on the closure, or directly below an upper opening of the respective container and are particularly not movable.

According to a further concept of the invention, the securing retainers extend outward, preferably as spring-loaded arms, from an upper bearing support or a station base positioned radially inward, in the direction of the container head or neck. The arms are preferably durably connected to the bearing support and/or to the station base, at least indirectly.

According to a further concept of the invention, the container is secured by the securing elements as soon the mold is in a perpendicular position. During the movement into the perpendicular position, the container head pivots between the securing elements.

According to a further concept of the invention, a particularly stationary securing plank is provided as the securing element, and this plank secures the containers against movements outwardly in the radial direction and is preferably effective in the region of container heads. The securing plank can be used on the neck, on the cover, on the closure, or directly below an upper opening of the respective container.

According to a further concept of the invention, a mold base and a retaining body connectable to the mold base are provided for the mold base, wherein the retaining body can be decoupled from the mold base when the mold is closed. The retaining body must not implement the inclination of the mold due to the decoupling.

According to a further concept of the invention, the retaining body and the mold base can be connected by means of locking bodies actuatable by hand and without tools. The locking bodies preferably contain spring-loaded levers, which engage notches. The spring-loaded levers prevent separation of the retaining body and the mold base. It should be possible to manually actuate the levers against the spring pressure in order to separate the retaining body and the mold base.

According to a further concept of the invention, the retaining body and mold base can be connected via locking bodies, wherein the locking bodies simultaneously form overload protection for the connection between the retaining body and the mold base. The locking bodies are preferably rendered effective by means of a force-fit or friction-fit, which can be overcome by a counterforce in a destruction-free manner. The counterforce can develop, for example, due to a malfunction in the device, for example when the retaining body attempts to move the mold base downward without the mold base previously having been separated from the mold shells. Particularly in this case, the locking bodies should enable a separation of the retaining body and the mold base.

According to a further concept of the invention, the retaining body and the mold base can be connected by means of locking bodies. In this case, parts of the mold have releasing bodies above the mold base, particularly mold shells, and these releasing bodies cause the locking bodies to release during closing of the mold. The retaining body and the mold base can be decoupled upon the releasing of the locking bodies.

According to a further concept of the invention, cams are provided to control the movement of the molds from the inclined position into a different position and back again. The other position is preferably the perpendicular position.

According to a further concept of the invention, cams are provided to control the movement of the retaining bodies for the mold base. The retaining bodies are moved up and down by the cams.

According to a further concept of the invention, the valve assemblies are aligned along filling axes, wherein the filling axes are aligned diagonally, i.e. not parallel as relates to the axis of rotation, particularly with an inclination against a part of the axis of rotation lying above the working wheel. The filling axes of the valve assemblies preferably have a spherical shape.

According to a further concept of the invention, the device has units for closing the containers in the station. An assembly is provided in each station, particularly for placement of a cover, combined with a valve assembly.

According to a further concept of the invention, the molds may have mold shells, which are provided with gripping cavities or gripping parts. This facilitates handling of the mold shells during replacement of same.

Figure 2:
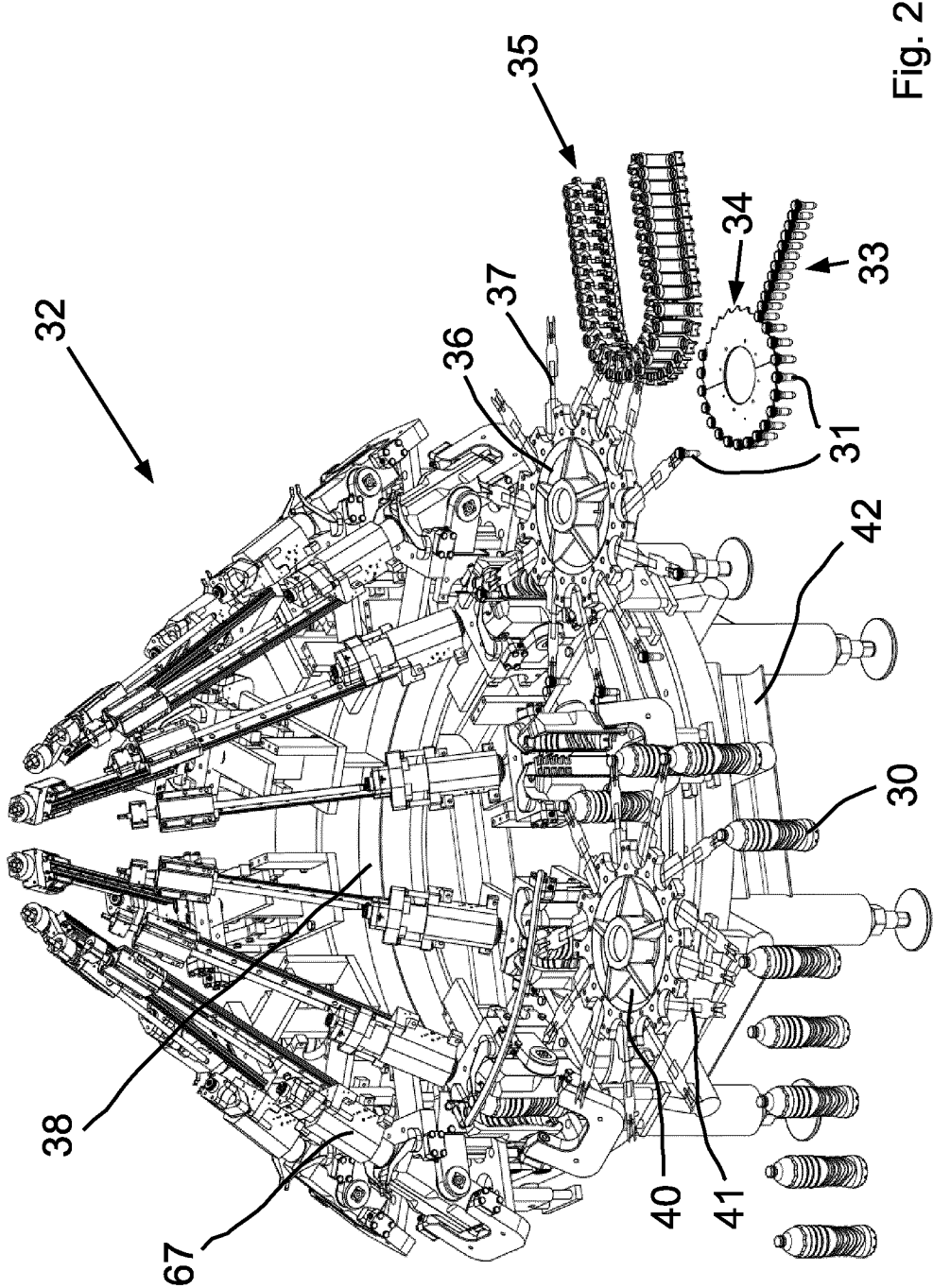
Figure 3:
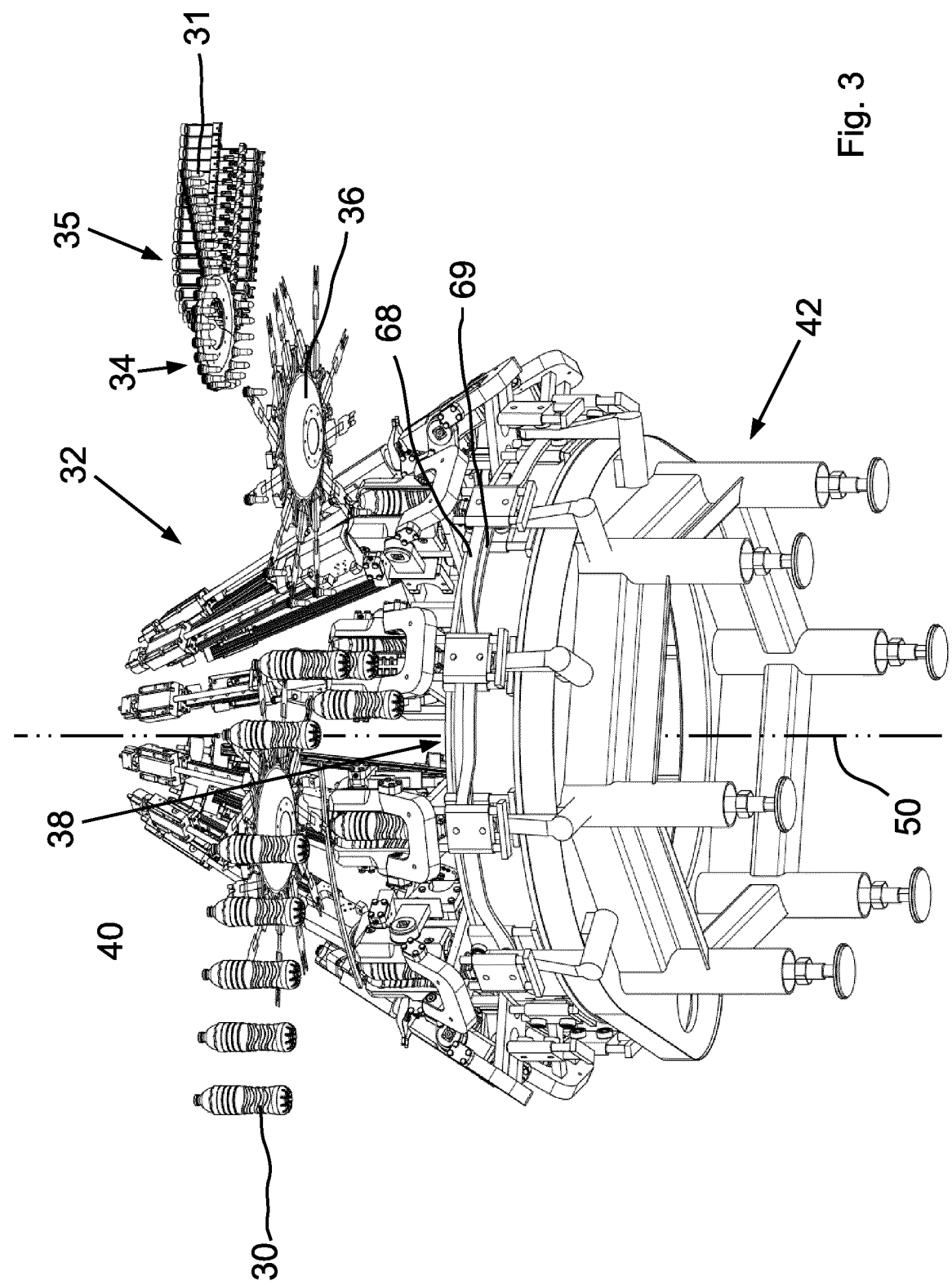
Figure 4:
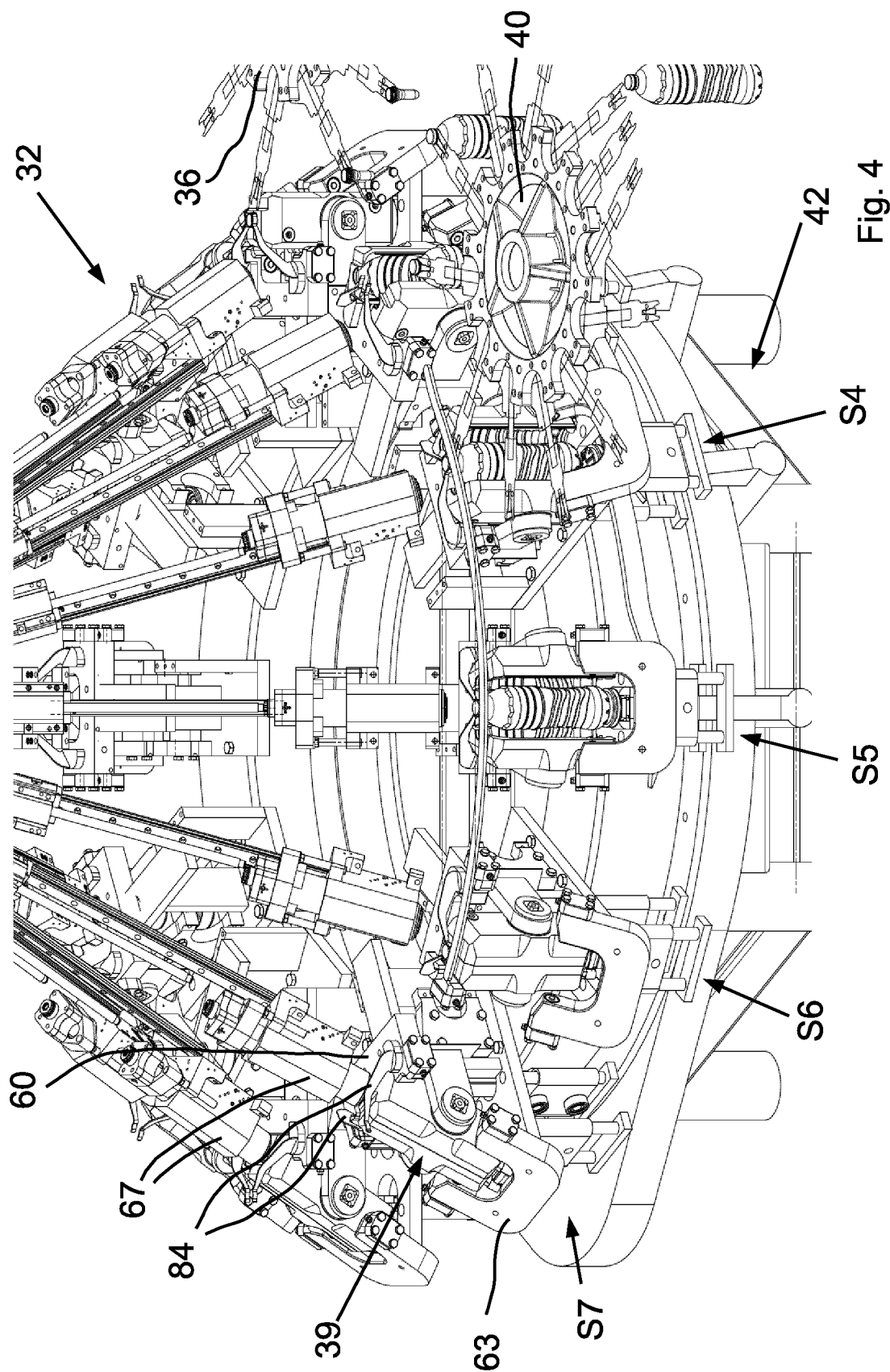
Figure 5:
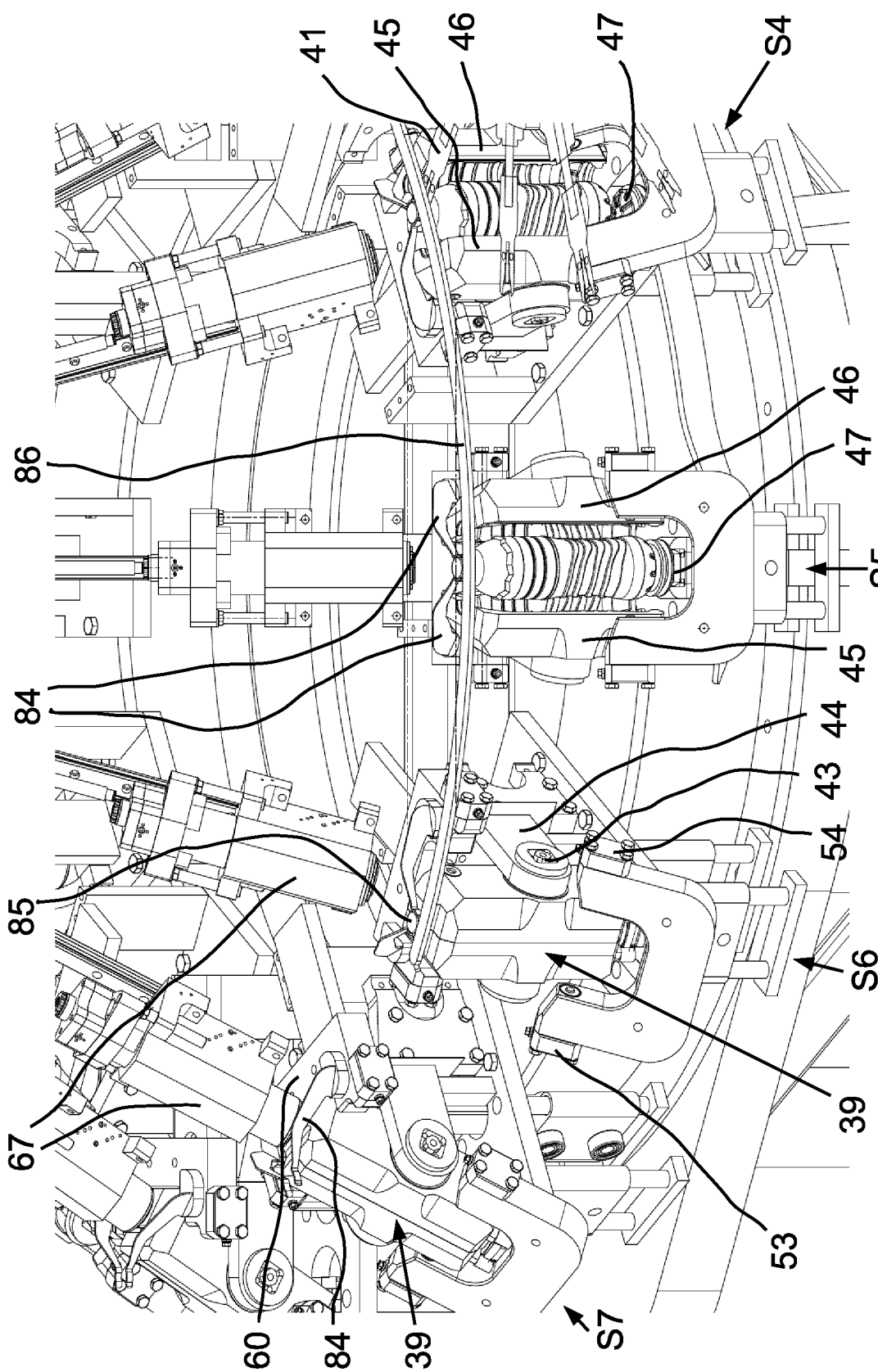
Figure 8:
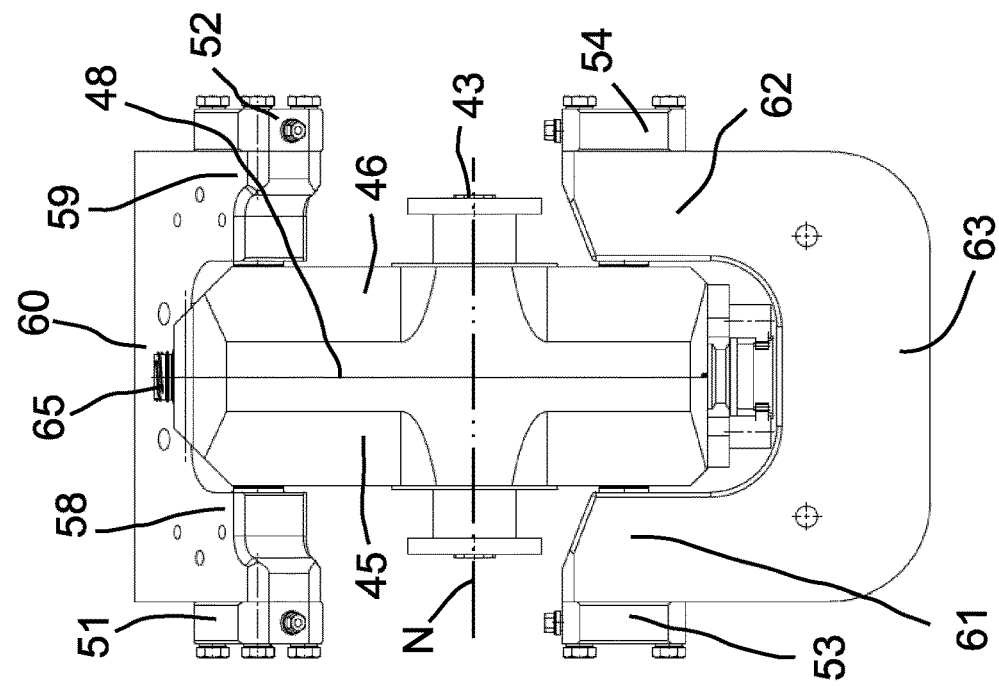
Figure 7:
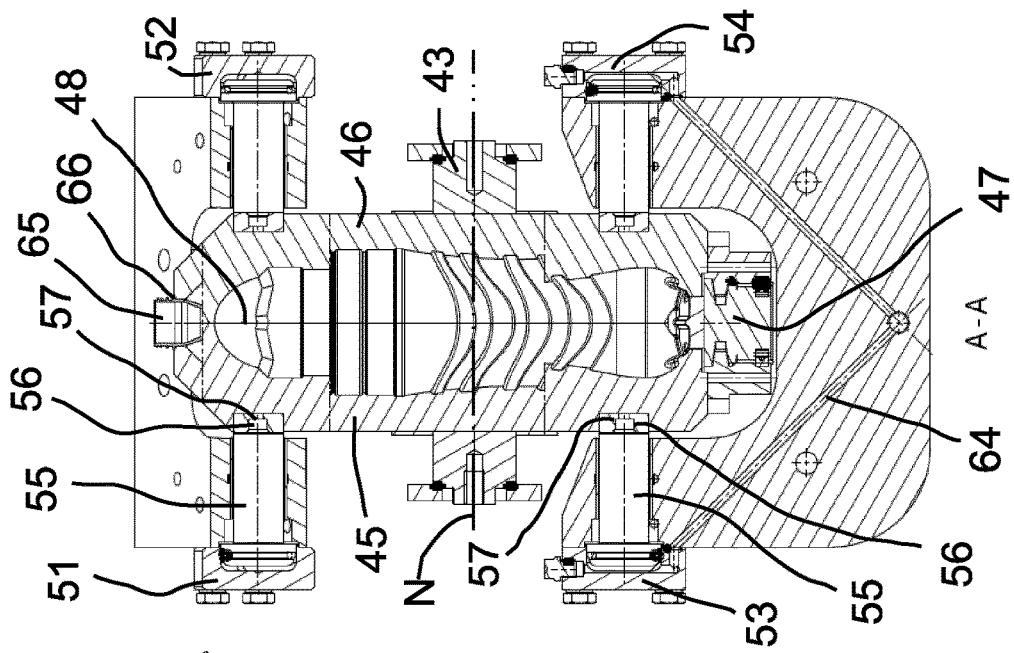
Figure 6:
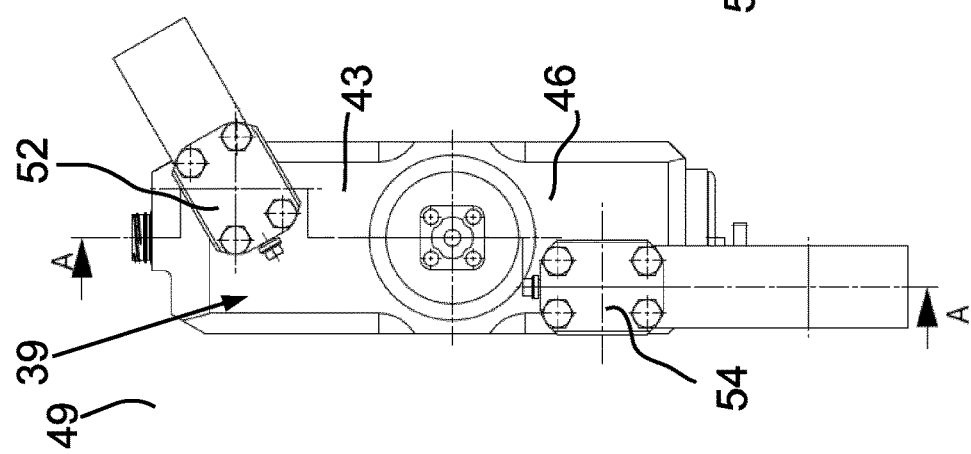
Figure 9:
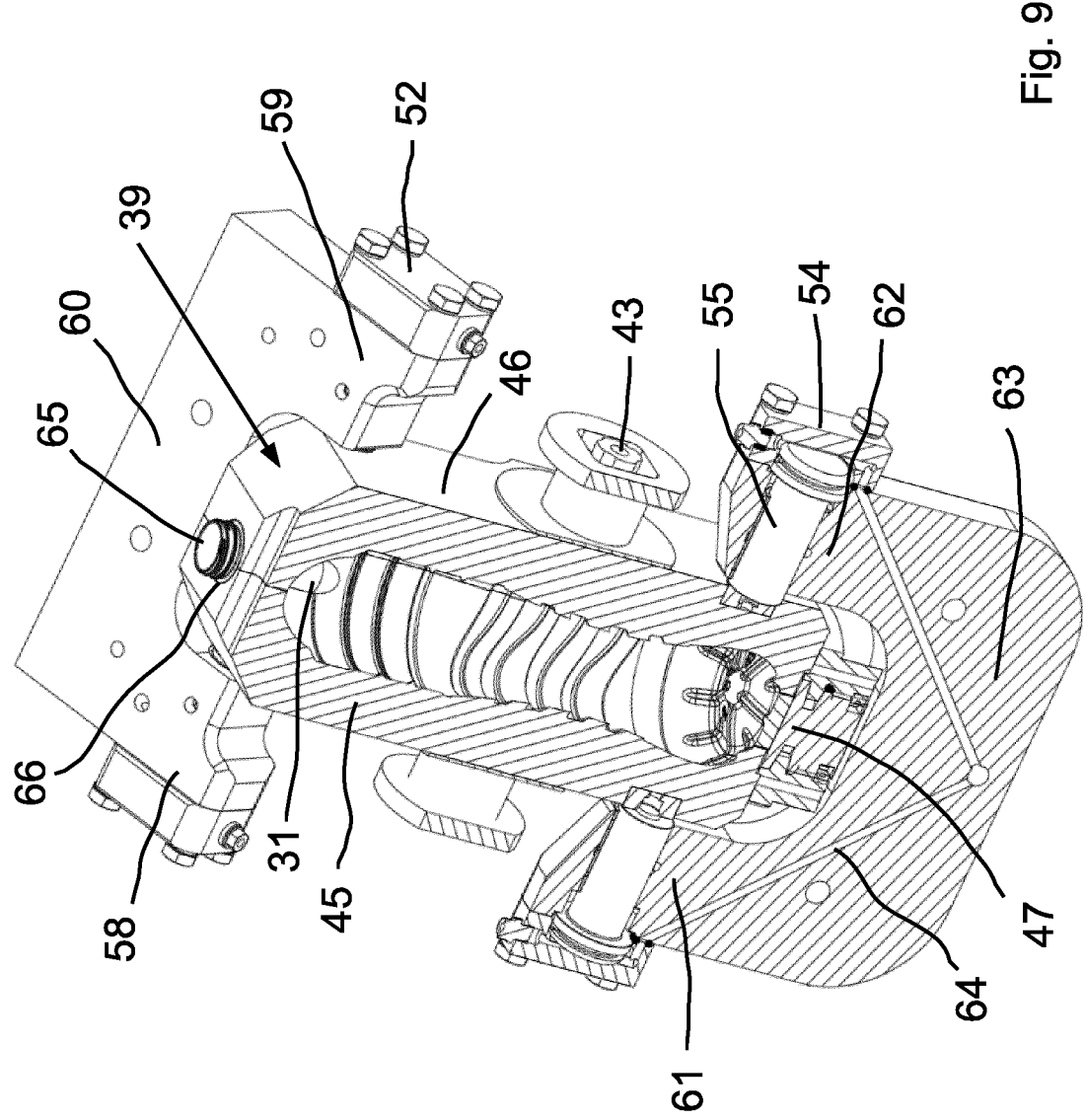
Figure 13:
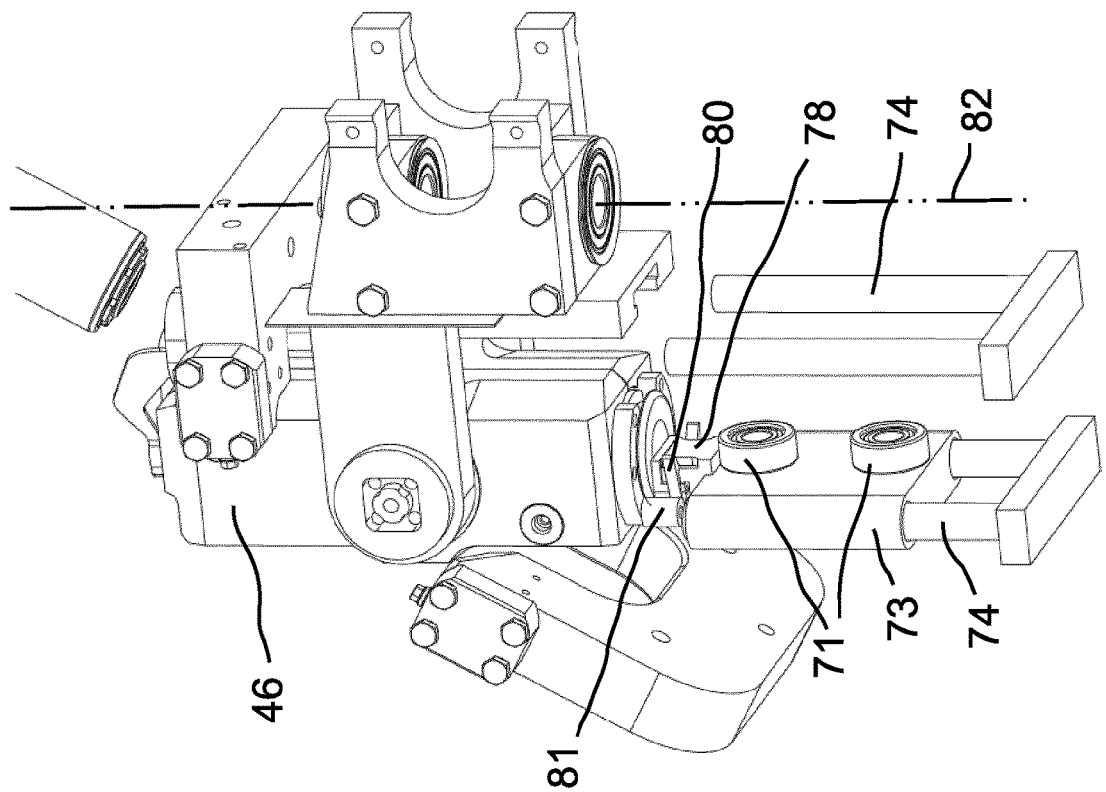
Figure 12:
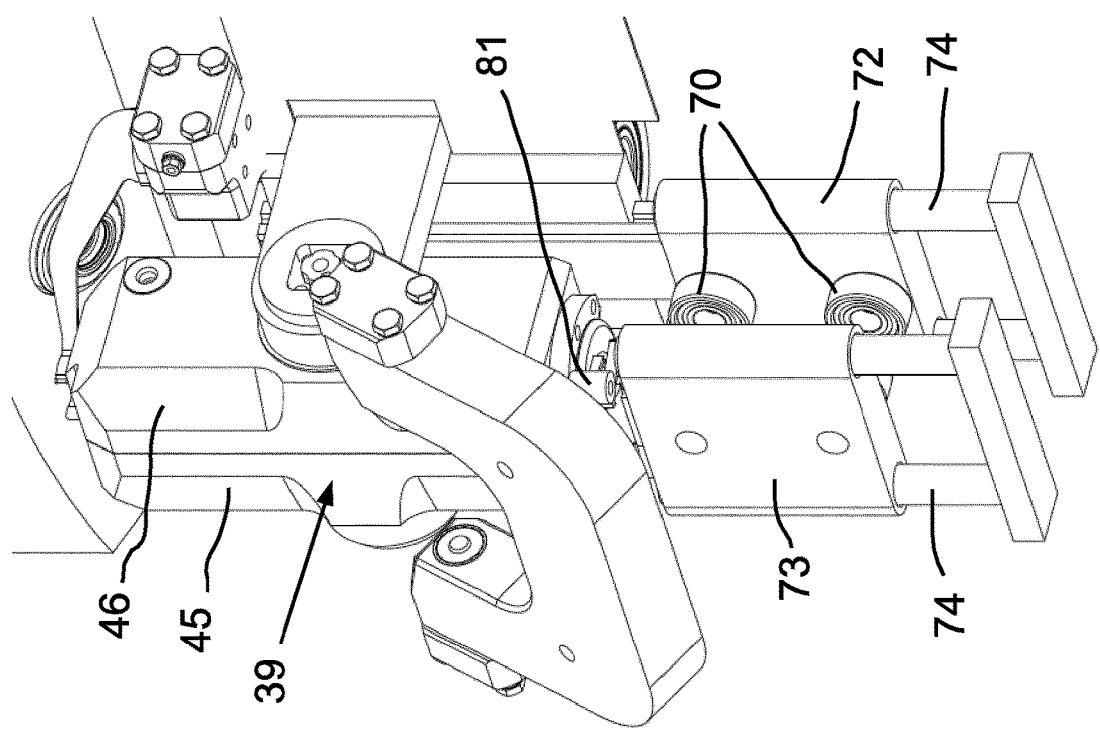
Figure 17:
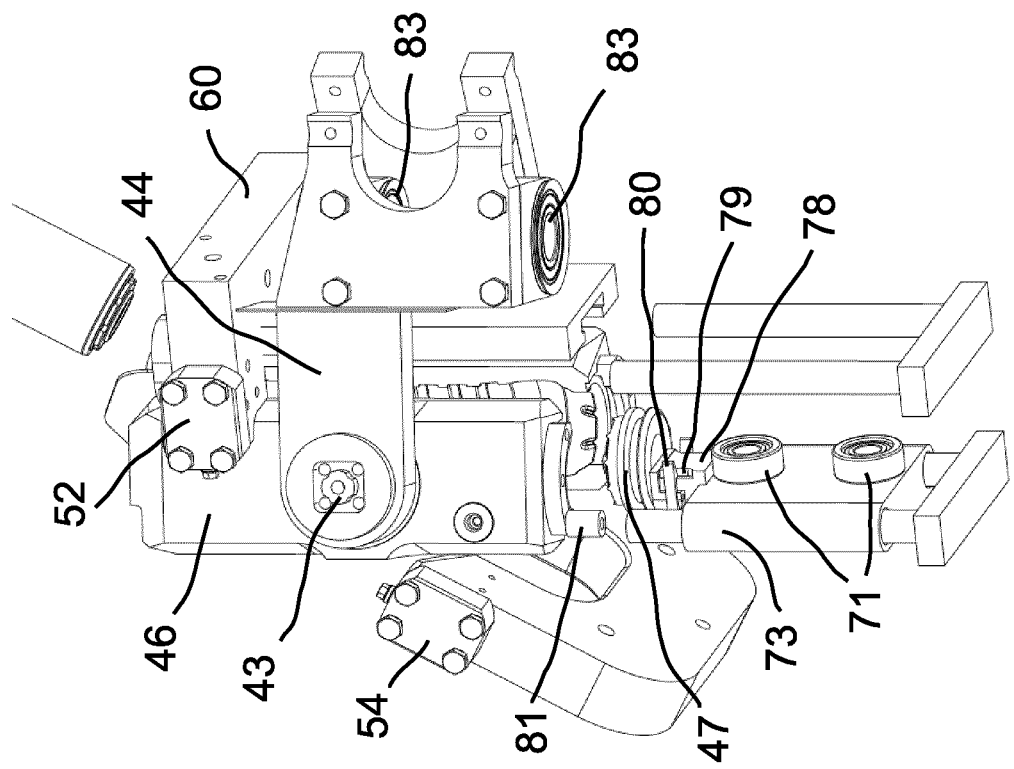
Figure 16:
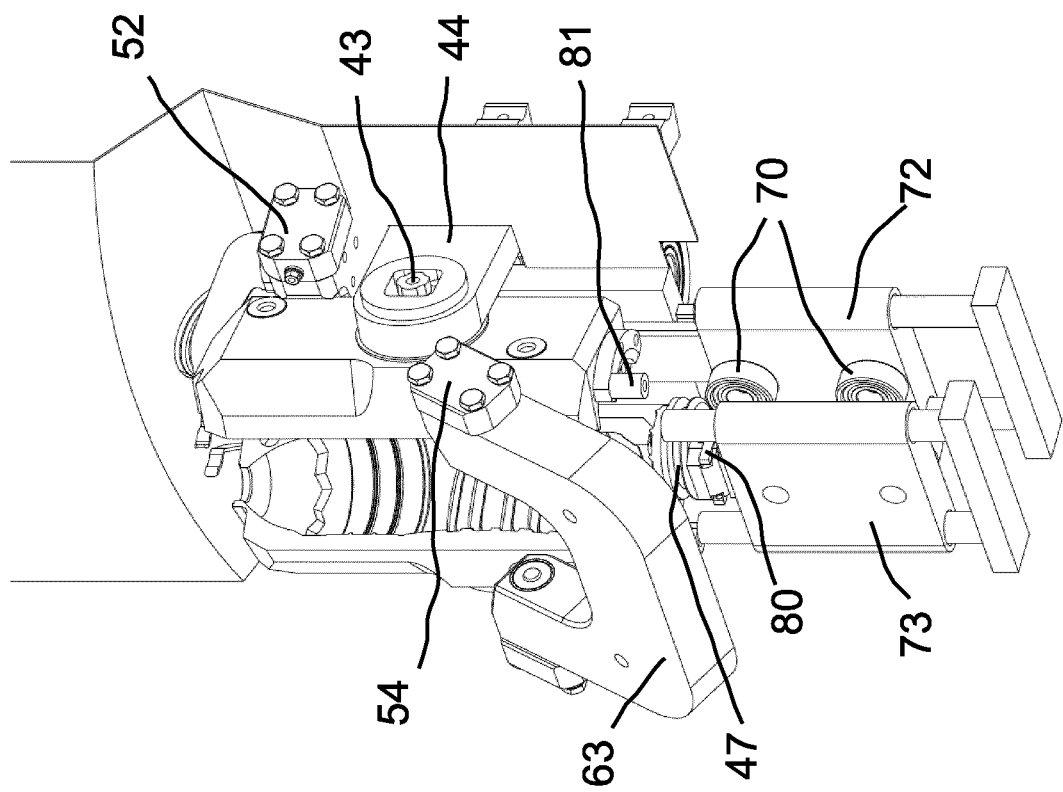
Figure 19:
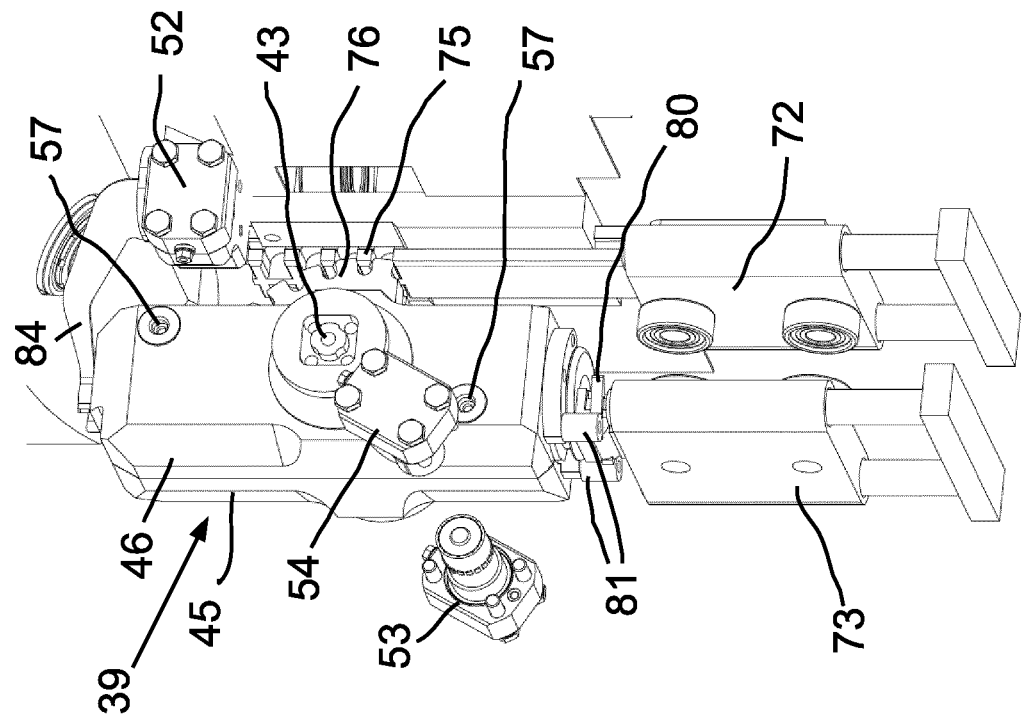
Figure 18:
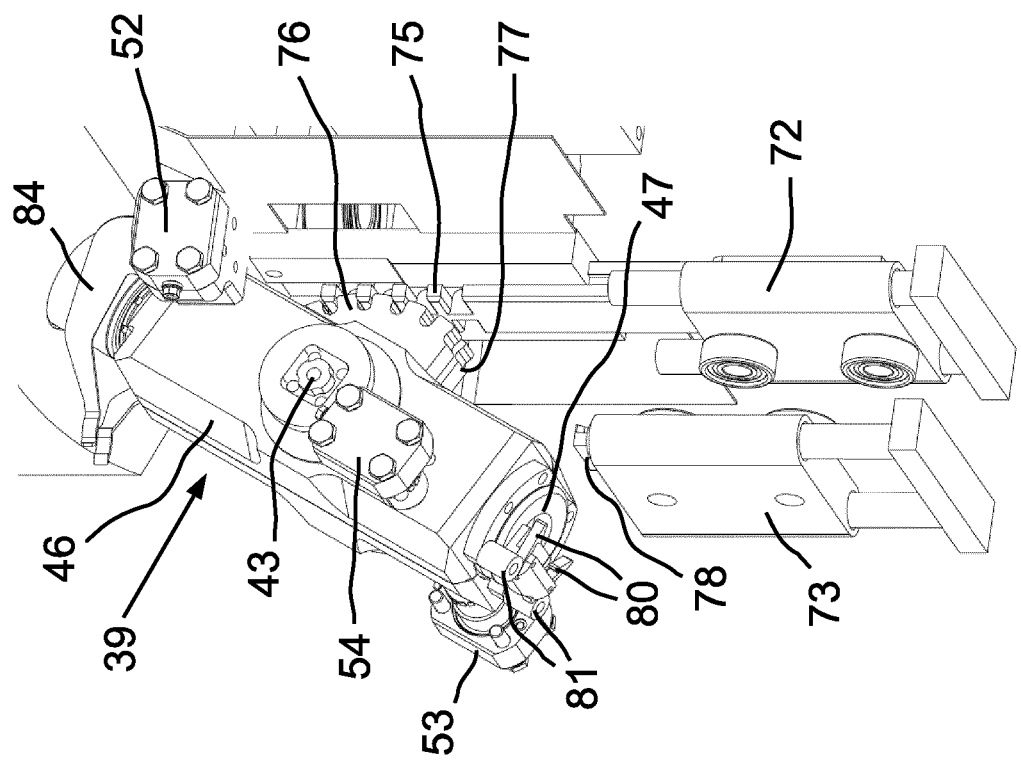
Figure 20:
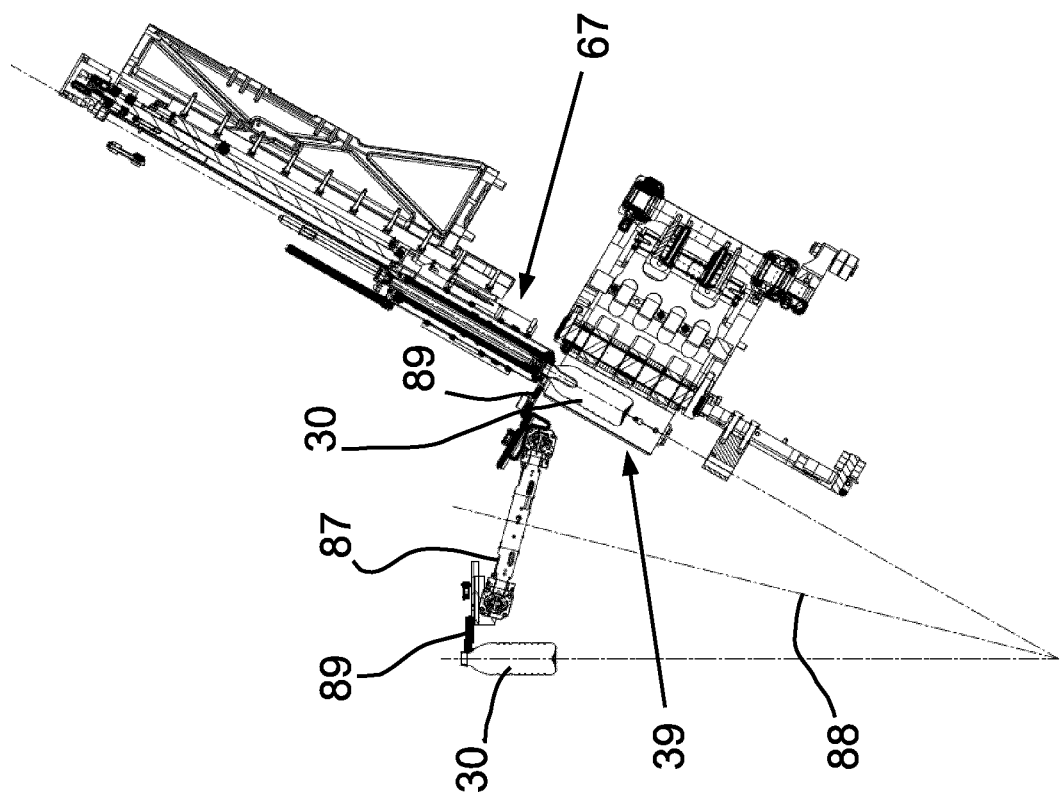

Additional features of the invention result from the description and, moreover, from the claims. Advantageous embodiments of the invention are subsequently further explained, based on the drawings. The following is shown:

FIG. 1 a top view from above of a device for producing containers made of thermoplastic parisons;

FIG. 2 a perspective view of the device according to FIG. 1;

FIG. 3 a further perspective view of the device according to FIG. 1;

FIG. 4 an enlarged cutout of the view according to FIG. 2;

FIG. 5 an enlarged cutout of the view according to FIG. 4;

FIG. 6 a side view (in the circumferential direction of a working wheel) of a closed inclined mold between thrust bearings;

FIG. 7 a sectional view of the mold between thrust bearings according to FIG. 6 along line A A, namely as a view perpendicular to the circumferential direction of the working wheel;

FIG. 8 a view of the mold between the thrust bearings according to FIG. 6 but in the direction according to FIG. 7;

FIG. 9 a mold with thrust bearings in the longitudinal section, similar to FIG. 7;

FIG. 10 a closed, inclined mold with thrust bearings and drive devices for adjustment in a perspective view;

FIG. 11 the inclined mold according to FIG. 10 in a further perspective view;

FIG. 12 the mold with thrust bearings and drives for adjustment, namely perpendicular and closed, in a perspective view;

FIG. 13 the mold according to FIG. 12 in a further perspective view;

FIG. 14 the mold with thrust bearings and drives for adjustment, namely open and with the base lifted, in a perspective view;

FIG. 15 the mold according to FIG. 14 in a further perspective view;

FIG. 16 the mold with thrust bearings and drives for adjustment, namely open and with the base lowered, in a perspective view;

FIG. 17 the mold according to FIG. 16 in a further perspective view;

FIG. 18 the closed, inclined mold with gearing elements for adjustment of the inclination, in a perspective view;

FIG. 19 the mold according to FIG. 18, but perpendicular;

FIG. 20 a variation of the device according to FIG. 1, namely with molds continuously inclined on the working wheel and a diagonally aligned transfer conveyor.

According to FIG. 1, a forming and filling mechanism 32 is provided as a device for producing containers 30 made of thermoplastic parisons 31. The parisons 31 are conveyed along a conveyor line 33 and transferred to a separating unit 34 and from there to a circulating heating track 35. A first transfer conveyor 36 grasps the individual parisons 31 with the aid of telescopic and pivotable gripper arms 37, which extend around a perpendicular axis and transfer the parisons 31 from the heating track 35 to the forming and filling mechanism 32.

The forming and filling mechanism 32 has a circulating working wheel 38 with stations S1, S2, S3 . . . to S12 arranged thereupon. Each of the circulating stations S1 to S12 has a mold 39 for producing a container 30 from a parison 31. The finished containers are removed from the molds 39 and conveyed away by means of a second transfer conveyor 40. Similar to the first transfer conveyor 36, the second transfer conveyor 40 is provided with circulating, telescopic, and pivotable gripper arms 41.

The two transfer conveyors 36, 40 are spaced apart from one another by a distance of about 60° in relation to the working wheel 38 rotating on a machine frame 42. Thus, the handling of the parisons 31 and containers 30 on the working wheel 38 takes place along a distance, which corresponds to an angle of rotation of about 300°.

The molds 39 are mounted in the stations, S1 to S12, so as to incline about axes of inclination N (provided the molds 39 are closed), namely in tilt bearings 43, which are arranged on mold supports 44; see particularly FIG. 5. The axes of inclination N of the tilt bearings 43 can be seen in FIGS. 7 and 8.

The molds 38 in this case consist substantially of three movable mold parts, namely of two perpendicular mold shells 45, 46 and one mold base 47. In the present example, the mold 39 is provided for the production of a PET bottle as a container 30. The two mold shells 45, 46 are formed substantially symmetrically, each having an inner contour corresponding to the outer contour of the bottle to be produced. In this case, the mold shells 45, 46 are adjacent one another along a parting line 48 which is perpendicular and directed radially as relates to the working wheel 38; see FIGS. 7 and 8.

In one embodiment which is not shown, the mold shells each have inserts, the inner contour of which corresponds to the outer contour of the bottle to be produced and which can be quickly swapped out.

The opening of the molds 39 is carried out due to pivoting of the mold supports 44 about a perpendicular pivoting axis and due to lowering of the mold base 47.

The molds 39 are closed and shown inclined in FIGS. 6 to 11. For the sake of simplicity, the mold 39 in FIG. 6 is shown upright, however. The actual inclination of the mold 39 can be seen by means of a comparison with a line 49 which is drawn in as inclined therein but in actuality is perpendicular. The upper part of the mold 39 is inclined in the direction of an axis of rotation 50 (FIG. 3) of the working wheel 38, i.e. as relates to the center of the working wheel, namely preferably at an angle of about 30°. Angular positions deviating from this may also be advantageous depending on the centrifugal forces occurring during production and thus the associated changes in the position of the liquid level in the containers 30.

Molds 39 and containers 30 and/or parisons 31 in this case are aligned identically as relates to one another. This means that when the mold 39 is perpendicular, i.e. it has no inclination, the container 30 and/or the parison 31 is also aligned perpendicularly. The alignment of the containers 30 is relevant.

The closed mold 39 is secured against the internal pressure occurring in its inclined position (FIGS. 6 to 11) by means of thrust bearings 51, 52, 53, 54 engaging from the outside. Upper thrust bearings 51, 52 act at opposite outer sides of an upper part of the mold 39 such that one thrust bearing 51, 52 engages each mold shell 45, 46 in the upper region. Similar to this, the lower thrust bearings 53, 54 are effective in the lower region of the mold 39 and at opposites sides of same; see particularly FIGS. 7 to 9.

Each thrust bearing, 51 to 54, has a hydraulic plunger 55, which presses a centering point 56 into a centering recess 57 corresponding thereto in the respective mold shell 45, 46.

The upper thrust bearings 51, 52 are arranged on legs 58, 59 of an upper bearing support 60, which forms a bearing gap between its legs 58, 59. The lower thrust bearings 53, 54 are arranged on legs 61, 62 of a lower bearing support 63, which likewise forms a bearing gap. The inclined containers 39 come to rest in the two bearing gaps. The bearing supports 60, 63 have channels 64 for hydraulic fluid for supplying the hydraulic plunger 55.

The opening, closing, and inclining of the molds 39 are coordinated with one another in time and from a process-control perspective. The parisons 31 are transferred to the perpendicular, open mold 39; see station S2 in FIG. 1. When the mold 39 closes, the parisons 31 are grasped at a container neck 65. In doing so, a support ring 66 of the container neck 65 comes to rest on an upper side of the mold 39; see FIG. 7. Subsequently, the closed mold 39 is inclined—see station S1 in FIG. 1—such that the mold 39 and container neck 65 are aligned coaxially with a valve assembly 67 provided in each station, S1 to S12. The valve assemblies 67 are inclined as relates to the center of the working wheel 38, i.e. in the direction of the axis of rotation 50 shown in FIG. 3, preferably by about 30°.

The parisons 31 are filled with the liquid, which is under high pressure and provided as container contents, in a region between stations S1 to S6 in FIG. 1 such that the containers 30 are simultaneously molded. In doing so, the molds 39 are inclined and secured against opening by means of thrust bearings 51 to 54.

The molds 39 are moved from the inclined position back into a perpendicular position approximately in a region between the stations S7, S6—see particularly FIG. 5—and subsequently opened by means of the pivoting apart of the two mold shells 45, 46—see particularly station S5 in FIG. 5. Subsequently, the containers are grasped under the support ring 66 by the gripper arms 41, and the mold base 47 is pivoted away; see station S4 in FIG. 5.

The inclination of the molds 39 in each of the stations, S1 to S12, as well as the lowering of the mold bases 47 is controlled by means of the interaction of the control cams 68, 69 with the control rollers 70, 71. The control rollers 70 are retained above one another with an intermediate space on a control roller carrier 72; the same thing applies to control rollers 71 on control roller carrier 73. The intermediate spaces between two control rollers 70 and/or between two control rollers 71 are to be dimensioned such that control cam 68 and/or control cam 69 fits in between, and guidance of the control roller carriers 72, 73 through the control cams 68, 69 is possible with almost no play.

The control roller carriers 72, 73 can be moved up and down on guide elements 74, i.e. on guide bars in this case. The guide elements 74 are arranged at fixed positions on stations S1 to S12 and circulate together with them.

The rear (radially inward) control roller carrier 72, shown to the right in FIGS. 10 to 19, controls the inclination of the mold 39 and is connected to a toothed rack 75 at the top for this purpose; see FIGS. 18, 19. Corresponding with this, the mold 39 has a toothed segment radially inward. This is specifically two toothed wheel segments 76, 77, namely one toothed wheel segment per mold shell 45, 46; see FIG. 18. The mold 39 is perpendicular (FIG. 19) when the control roller carrier 72 is moving upward; the mold 39 is inclined (FIG. 18) when the control roller carrier 72 is moving downward.

The radially external control roller carrier 73 is connected to a retaining body 78 for the mold base 47. Lateral notches 79 (FIG. 11) are provided on the retaining body 78 for the use of clamping elements 80. The clamping elements 80 in this case are two-armed levers on the lower side of the mold base 47 are a spring-loaded for engaging the notches 79 (not shown).

Downwardly directed pins are arranged as pressure elements 81 on the lower sides of the mold shells 45, 46, said pins impacting the two-armed clamping elements 80 on one end during closing of the mold shells 45, 46 and thus loosening the connection between the clamping elements 80 and the notches 79. The pressure elements 81 in this case are loosening elements for the clamping elements 80 effective as locking bodies, said clamping elements interacting with the notches 79. In this case, the loosening elements are assigned to the mold shells 45, 46, and the locking bodies are assigned to the mold base 47. Only the notches 79 are connected, as features of the retaining body 78, to the control roller carrier 73.

The opening and closing of the mold shells 45, 46 can be controlled by drives, which are not shown, particularly as a function of the current angle of rotation of the respective station, S1 to S12, on the working wheel 38 relative to the machine frame 42. The mold supports 44 of both mold shells 45, 46 can be pivoted about a common perpendicular axis 82; see particularly FIG. 11. Corresponding pivot bearings 83 are also shown therein.

FIGS. 4 and 5 show the movement of the molds 39 up to the point of removal of the containers 30. The filling process is completed in the region of station S7. The mold 39 is still in an inclined position between the bearing supports 60, 63.

The mold 39 in station S6 has already been pivoted into the perpendicular position but is not yet closed. The mold shells 45, 46 are no longer impacted by thrust bearings 51 to 54.

The mold in station S5 is open, i.e. the mold shells 45, 46 are moved apart from one another, while the mold base 47 is still in its upper position.

Station S4 is located directly opposite the second transfer conveyor 40. One of the gripper arms 41 grasps the container 30 underneath the support ring 66 such that the container is also retained in the vertical direction. Accordingly, the mold base 47 has already been lowered here.

In the last region, before the removal of the containers 30 from the open molds, the containers 30 are secured, in a special manner, against movements in the circumferential direction of the working wheel 38, in the radial direction, and in the vertical direction. A downward movement of the containers 30 is prevented by means of the mold bases 47 still situated in their upper position.

Movements in the circumferential direction are prevented by means of securing retainers 84 provided specifically for this purpose. As a securing retainer 84, each station, S1 to S12, has two particularly spring-loaded arms, which extend from the upper bearing support 60 or from a station base in the direction of a container neck or container closure 85, namely on both sides of same, such that the container 30 is supported in the circumferential direction and against the circumferential direction in this region. Free ends of the arms may be curved and may extend partially or somewhat about the closure 85; see particularly the design of the securing retainer 84 in FIGS. 10, 11.

Because the arms (securing retainers 84) are arranged at fixed positions on the respective station, S1 to S12, the described securing only occurs in the perpendicular position of the molds 39 (with the containers 30). In the inclined position of the molds 39, the securing retainers 84 are ineffective and/or the upper part of the mold 39 is then not positioned between the securing retainers 84; see particularly station S7 in FIGS. 4, 5.

A securing plank 86, which supports the container neck or the closure 85 in the radial direction (outwardly), is provided on the machine frame 42 as a further securing element. The securing plank 86 in this case extends over an angle of rotation of somewhat more than two stations, corresponding, for example, to more than 60°. In the region of station S4, the securing plank 86 is bent slightly radially outward and then ends, adapted to the kinematics of the gripper arms 41.

In FIGS. 1 to 3, the securing plank 86 is shown to be about 30° shorter, i.e. beginning later in the direction of rotation. The specific course of the securing plank 86 depends on the point in time of the opening of the mold 39. As soon as the mold 39 starts to open, the container 30 should be supported in the radial direction.

Units for closing the containers—not shown—can be integrated into the valve assemblies 67, within station S1 to S12. In this case, the closing may be provisional or not yet complete. Advantageously, at least a provisional closing is before the removal of the containers from the molds.

FIG. 20 shows a sectional view of an alternative embodiment. As previously shown, individual stations are arranged on a working wheel. Differently than before, the molds cannot be inclined in the stations but instead are exclusively in a position inclined as compared to the perpendicular. The angle is 30° for example. Accordingly, the finished containers 30 must be removed from the molds 39 in an inclined position. The goal is conveyance of the containers 30 in the perpendicular position as shown to the left in FIG. 20. In order to enable this, a transfer conveyor 87, which corresponds in function to the second transfer conveyor 40, is arranged with an inclined axis of rotation 88, the inclination of which amounts to half the inclination of the containers 30 in the molds 39. Correspondingly, gripper arms 89 are angled downward relative to a plane of rotation of the transfer conveyor 87 such that the gripper arm 89 is aligned horizontally when the containers 30 are discharged to a removal conveyor.

The device explained by means of the figures enables particularly the forming of the containers from the parisons with simultaneous filling (hydroforming) at a high rate of circulation of the working wheel and while preventing liquid losses caused by centrifugal forces. At the same time, the mold shells 45, 46 are securely held together by means of the described thrust bearings, 51 to 54. In this case, the bearings participating in the movement of the mold shells are not loaded. Instead, the internal pressure exerted on the two mold shells 45, 46 during forming of the containers is applied to the thrust bearings, which are rigidly connected to each other, and compensated for. In the present case, thrust bearings opposite one another are even retained on a rigid common component, namely on the bearing supports 60, 63.

| List of reference numerals | |
| --- | --- |
| 30 | Container |
| 31 | Parisons |
| 32 | Forming and filling mechanism |
| 33 | Conveyor line |
| 34 | Separating unit |
| 35 | Heating track |
| 36 | First transfer conveyor |
| 37 | Gripper arms |
| 38 | Working wheel |
| 39 | Molds |
| 40 | Second transfer conveyor |
| 41 | Gripper arms |
| 42 | Machine frame |
| 43 | Tilt bearing |
| 44 | Mold support |
| 45 | Mold shells |
| 46 | Mold shells |
| 47 | Mold bases |
| 48 | Separating line |
| 49 | Perpendicular line |
| 50 | Axis of rotation |
| 51 | Thrust bearing |
| 52 | Thrust bearing |
| 53 | Thrust bearing |
| 54 | Thrust bearing |
| 55 | Hydraulic plunger |
| 56 | Centering points |
| 57 | Centering recesses |
| 58 | Leg |
| 59 | Leg |
| 60 | Upper bearing support |
| 61 | Leg |
| 62 | Leg |
| 63 | Lower bearing support |
| 64 | Hydraulic channels |
| 65 | Container neck |
| 66 | Support ring |
| 67 | Valve assemblies |

-continued

| List of reference numerals | |
| --- | --- |
| 68 | Inner control cam |
| 69 | Outer control cam |
| 70 | Control rollers |
| 71 | Control rollers |
| 72 | Control roller carrier |
| 73 | Control roller carrier |
| 74 | Guide elements |
| 75 | Toothed rack |
| 76 | Toothed wheel segments |
| 77 | Toothed wheel segments |
| 78 | Retaining bodies |
| 79 | Notches |
| 80 | Clamping elements |
| 81 | Pressure elements |
| 82 | Pivoting axis |
| 83 | Pivot bearing |
| 84 | Securing retainer |
| 85 | Closure |
| 86 | Securing plank |
| 87 | Transfer conveyor |
| 88 | Axis of rotation |
| 89 | Gripper arms |
| N | Axis of inclination |

The invention claimed is:

1. A device for producing containers from thermoplastic parisons comprising:
a working wheel having an axis of rotation; and
a plurality of working wheel stations arranged on said working wheel, each of said working wheel stations including an openable and closable mold and an associated valve assembly for supplying a fluid under pressure to a parison received in the mold when the mold is in a closed position to form a container that is removable from the mold when the mold is in an open position;
wherein the mold is inclined on the working wheel at least temporarily during rotation of the working wheel such that a central axis taken through the container formed in the mold when the mold is in the closed position is inclined relative to the axis of rotation of the working wheel, and
wherein each mold comprises a plurality of mold shells mounted on mold supports, wherein the mold supports or the mold shells have tilt bearings with axes of inclination, and wherein the tilt bearings are loosenable in an axial direction.

2. The device according to claim 1, wherein each mold is mounted in a respective one of the plurality of wheel stations so as to tilt about an axis of inclination, and wherein the axis of inclination extends close to a center of mass of the mold such that a distribution of mass of the mold is no more unequal than ⅓ to ⅔ on both sides of the axis of inclination.

3. The device according to claim 1, further comprising a drive for inclining the molds.

4. The device according to claim 1, wherein each mold is mounted in a respective one of the plurality of wheel stations so as to be tiltable to have an axis of inclination extending tangentially as relates to a circumferential direction or along a movement track, which defines a movement plane perpendicular to tangents of the circumferential direction.

5. The device according to claim 1, wherein each mold comprises a plurality of mold shells mounted on mold supports, wherein each mold support supports one mold shell, and wherein the mold supports are movable apart from one another for opening the mold and are movable toward one another for closing the mold.

6. The device according to claim 1, wherein each mold comprises a plurality of mold shells mounted on mold supports, and wherein the mold shells are mounted directly on and proximate to the mold supports without mold mounts or mold retainers arranged in between.

7. The device according to claim 5, wherein the mold shells are tiltable about an axis of inclination, and wherein the mold supports or mold shells have tilt bearings for tilting the mold shells about the axis of inclination.

8. The device according to claim 1, wherein each wheel station has securing elements for securing the position of the container in mold when the mold is in the open position.

9. The device according to claim 1, further comprising a mold base and a retaining body connectable to the mold base, wherein the retaining body is decoupleable from the mold base when the mold is in the closed position.

10. The device according to claim 1, further comprising cams for controlling movement of the molds from the inclined position into a different position and back again.

11. The device according to claim 1, wherein the valve assemblies are aligned along filling axes, and wherein the filling axes are aligned diagonally so as not to be parallel to the axis of rotation.

12. The device according to claim 1, further comprising units for closing the containers while the containers are in the working wheel stations.

13. The device according to claim 1, wherein each mold comprises a plurality of mold shells, which are provided with gripping cavities or gripping parts.

14. A device for producing containers from thermoplastic parisons comprising:
 a working wheel having an axis of rotation;
 a plurality of working wheel stations arranged on said working wheel, each of said working wheel stations including an openable and closable mold and an associated valve assembly for supplying a fluid under pressure to a parison received in the mold when the mold is in a closed position to form a container that is removable from the mold when the mold is in an open position; and
 thrust bearings for securing each mold in the closed position against opening caused by internal pressure, wherein the thrust bearings and molds are movable relative to one another between one pressure-absorbing position, in which the thrust bearings impact the molds in the closed position externally, and another position, in which the thrust bearings do not impact the molds;
 wherein the mold is inclined on the working wheel at least temporarily during rotation of the working wheel such that a central axis taken through the container formed in the mold when the mold is in the closed position is inclined relative to the axis of rotation of the working wheel.

15. The device according to claim 14, wherein each mold is mounted in a respective one of the plurality of wheel stations so as to tilt about an axis of inclination, and wherein the axis of inclination extends close to a center of mass of the mold such that a distribution of mass of the mold is no more unequal than $1/3$ to $2/3$ on both sides of the axis of inclination.

16. The device according to claim 14, wherein the molds are each mounted in the working stations so as to tilt about an axis of inclination, wherein the axis of inclination extends between the thrust bearings of each mold such that the distance between the axis of inclination and the next thrust bearing is no more than half as large as relates to the thrust bearing farthest away.

17. The device according to claim 14, wherein the thrust bearings have a centering function such that the molds in the closed position are impacted by the thrust bearings in a centering manner.

18. The device according to claim 14, wherein the thrust bearings contain driven movable plungers for establishing contact with the mold.

19. The device according to claim 14, wherein thrust bearings of working stations that are opposite one another are coupled together with force and positive locking.

20. The device according to claim 14, wherein thrust bearings opposite one another are provided for an upper region of the respective mold.

21. The device according to claim 14, wherein thrust bearings opposite one another are provided for a lower region of the respective mold.

22. The device according to claim 21, wherein support legs of a lower bearing support are aligned diagonally upward such that a support base connecting the support legs is positioned underneath a plane of a container base.

23. The device according to claim 22, wherein stationary securing retainers are provided as the securing elements, and said securing retainers securing the containers against movements in the circumferential direction.

24. The device according to claim 23, wherein the securing retainers extend outward as arms, from an upper bearing support or a station base positioned radially inward, in the direction of a head or neck of the container.

25. The device according to claim 22, wherein the container is secured by the securing elements when the mold is aligned such that the central axis is perpendicular to the axis of rotation of the working wheel.

26. The device according to claim 22, wherein a stationary securing plank is provided as the securing element, which plank secures the containers against movements outwardly in the radial direction.

27. The device according to claim 23, wherein the securing retainers and the mold base is connected by means of locking bodies actuatable by hand and without tools.

28. The device according to claim 23, wherein the retaining body and the mold base are connectable via locking bodies, wherein the locking bodies simultaneously form overload protection for the connection between the retaining body and the mold base.

29. The device according to claim 23, wherein the retaining body and mold base are connectable via locking bodies, and wherein parts of the mold have releasing bodies above the mold base, which releasing bodies cause the locking bodies to release during closing of the mold.

30. The device according to any of claim 23, further comprising cams for controlling movement of the retaining bodies for the mold base.

31. A device for producing containers from thermoplastic parisons comprising:
 a working wheel having an axis of rotation; and
 a plurality of working wheel stations arranged on said working wheel, each of said working wheel stations including an openable and closable mold and an associated valve assembly for supplying a fluid under pressure to a parison received in the mold when the mold is in a closed position to form a container that is removable from the mold when the mold is in an open position;
 wherein the mold is inclined on the working wheel at least temporarily during rotation of the working wheel such that a central axis taken through the container formed in the mold when the mold is in the closed position is inclined relative to the axis of rotation of the working wheel, and wherein each mold comprises a plurality of mold shells mounted on mold supports, wherein the mold supports or the mold shells have tilt bearings with axes of inclination, and wherein the tilt bearings are sliding bearings.

32. The device according to claim 31, wherein each mold is mounted in a respective one of the plurality of wheel stations so as to tilt about an axis of inclination, and wherein the axis of inclination extends close to a center of mass of the mold such that a distribution of mass of the mold is no more unequal than $\frac{1}{3}$ to $\frac{2}{3}$ on both sides of the axis of inclination.

33. The device according to claim 31, further comprising a drive for inclining the molds.

34. The device according to claim 31, wherein each mold is mounted in a respective one of the plurality of wheel stations so as to be tiltable to have an axis of inclination extending tangentially as relates to a circumferential direction or along a movement track, which defines a movement plane perpendicular to tangents of the circumferential direction.

35. The device according to claim 31, wherein each mold comprises a plurality of mold shells mounted on mold supports, wherein each mold support supports one mold shell, and wherein the mold supports are movable apart from one another for opening the mold and are movable toward one another for closing the mold.

36. The device according to claim 31, wherein each mold comprises a plurality of mold shells mounted on mold supports, and wherein the mold shells are mounted directly on and proximate to the mold supports without mold mounts or mold retainers arranged in between.

37. The device according to claim 35, wherein the mold shells are tiltable about an axis of inclination, and wherein the mold supports or mold shells have tilt bearings for tilting the mold shells about the axis of inclination.

38. The device according to claim 31, wherein each wheel station has securing elements for securing the position of the container in mold when the mold is in the open position.

39. The device according to claim 31, further comprising a mold base and a retaining body connectable to the mold base, wherein the retaining body is decoupleable from the mold base when the mold is in the closed position.

40. The device according to claim 31, further comprising cams for controlling movement of the molds from the inclined position into a different position and back again.

41. The device according to claim 31, wherein the valve assemblies are aligned along filling axes, and wherein the filling axes are aligned diagonally so as not to be parallel to the axis of rotation.

42. The device according to claim 31, further comprising units for closing the containers while the containers are in the working wheel stations.

43. The device according to claim 31, wherein each mold comprises a plurality of mold shells, which are provided with gripping cavities or gripping parts.

* * * * *